United States Patent [19]
Kennedy et al.

[15] 3,665,003
[45] May 23, 1972

[54] CEPHALOSPORIN COMPOUNDS

[72] Inventors: James Kennedy, South Harrow; Alan Gibson Long, Greenford; William G. E. Underwood, Stoke Poges, all of England

[73] Assignee: Glaxo Laboratories Limited, Greenford, England

[22] Filed: Aug. 13, 1968

[21] Appl. No.: 752,191

[30] Foreign Application Priority Data

Aug. 21, 1967 Great Britain................38,493/67

[52] U.S. Cl. .........................................260/243 C, 424/246
[51] Int. Cl. ..........................................C07d 99/24
[58] Field of Search ............................260/243 C

[56] References Cited

UNITED STATES PATENTS 3,261,832   7/1966   Cowley et al.................260/243 C
3,459,746   8/1969   Flynn..............................260/243 C Primary Examiner—Nicholas S. Rizzo
Attorney—Bacon & Thomas

[57] ABSTRACT

7β-Acylamidoceph-3-em-4-carboxylic acids having an etherified 3-hydroxymethyl group, physiologically acceptable base or acid addition salts thereof and intermediates for the preparation of the acids and salts.

12 Claims, No Drawings

CEPHALOSPORIN COMPOUNDS

This invention is concerned with cephalosporin compounds having antibacterial activity and intermediates for use in the preparation of such compounds.

The compounds referred to in this specification are generally named with reference to cepham which has the structure

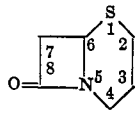

(see J.A.C.S. 1962, 84, 3400).

Cephalosporin antibiotics are of great interest in that a number of them are of value in the treatment of infections caused by a variety of gram positive and gram negative pathogenic bacteria. Additionally these antibiotics are of value in that they can be administered to penicillin hypersensitive patients. To date most cephalosporin antibiotics which have significant antibacterial activity require to be administered by injection. These antibiotics usually have a substituent in the 3-position which is either an acetoxymethyl or pyridiniummethyl group.

We have now found that cephalosporin antibiotics having an etherified hydroxymethyl group at the 3-position show significant absorption after oral administration as evidenced by the level of the urinary recovery of the antibiotic following oral administration to rats. Moreover 3-etherified hydroxymethyl groups appear to possess greater in vivo stability as evidenced by animal tests than do 3-acetoxymethyl groups. Cephalosporin antibiotics having 3-pyridiniummethyl groups are in general not well absorbed after oral administration.

Our invention may thus be stated as providing a cephalosporin antibiotic with a 3-etherified hydroxymethyl group in place of the existing substituent at the 3-position to enhance its absorption on oral administration. These novel cephalosporin antibiotics may be defined as 7$\beta$-acylamido-3-etherified hydroxymethyl-ceph-3-em-4-carboxylic acids and non-toxic derivatives thereof e.g., base salts, and acid addition salts. By the term "non-toxic" as applied to the derivatives we mean those derivatives which are physiologically acceptable in the dosage at which they are administered.

The 3-etherified hydroxymethyl group may be represented by the formula:

$$-CH_2OR$$

wherein R may be lower alkyl (e.g., methyl, ethyl, n-propyl, isopropyl, n-butyl, isobutyl etc.); lower alkenyl (e.g., vinyl, allyl, isopropenyl, etc.); lower alkynyl (e.g., ethynyl, propynyl, etc); lower cycloalkyl (e.g., cyclopentyl, cyclohexyl, etc); lower cycloalkyl lower alkyl (e.g., cyclopentylmethyl, cyclohexylethyl etc.); aryl (e.g., phenyl or naphthyl); aryl lower alkyl (e.g., benzyl); heterocyclic; heterocyclic lower alkyl (e.g., furfuryl) or any of these groups substituted by, for example, one or more of lower alkoxy (methoxy, ethoxy, etc.), lower alkylthio (methylthio, ethylthio etc), halogen (chlorine, bromine, iodine or fluorine), lower alkyl (methyl, ethyl etc), nitro, hydroxy, acyloxy, carboxy, carbalkoxy, lower alkylcarbonyl, lower alkylsulphinyl, lower alkylsulphonyl, lower alkoxysulphonyl, amino, lower alkylamino or acylamino groups.

We particularly prefer those compounds wherein R is a lower alkyl group, particularly wherein R is a methyl group. These 7$\beta$-acylamido-3-lower alkoxymethylceph-3-em-4-carboxylic acids have shown interesting properties as orally administrable antibiotics.

ACYL GROUPS

While the 7$\beta$-acylamido group may include an acyl group in general terms, one may use specific acyl radicals as defined in the following general formulae, but it should, however, be noted that this is not intended to be an exhaustive list of all the possible N-acyl groups which may be present.

i. $R^u C_n H_{2n} CO$ — where $R^u$ is aryl (carbocyclic or heterocyclic), cycloalkyl, substituted aryl, substituted cycloalkyl, or a non-aromatic heterocyclic group, and n is an integer from 1 – 4. Examples of this group include phenylacetyl, substituted phenylacetyl, e.g., fluorophenylacetyl, nitrophenylacetyl, acetoxyphenylacetyl, alkanoylphenylacetyl, or hydroxyphenylacetyl, thienyl-2- and -3-acetyl, 4-isoxazolyl- and substituted 4-isoxazolylacetyl and pyridylacetyl. The substituted 4-isoxazolyl group may be a 3-aryl-5-methyl-isoxazol-4-yl group, the aryl group being e.g., phenyl or halophenyl, e.g., chloro- or bromo-phenyl. An acyl group of this type is 3-o-chlorophenyl-5-methyl-isoxazol-4-yl-acetyl.

ii. $C_n H_{2n+1} CO$— where n is an integer from 1 – 7. The alkyl group may be straight or branched, and if desired, may be interrupted by an oxygen or sulphur atom or substituted by e.g., a cyano group. Examples of such groups include hexanoyl, heptanoyl, octanoyl, butylthioacetyl, and cyanoacetyl.

iii. $C_n H_{2n-1} CO$ — where n is an integer from 2 – 7. The alkenyl group may be straight or branched and, if desired, may be interrupted by an oxygen or a sulphur atom. An example of such a group is allylthioacetyl.

iv. $R^u O \cdot CH_2 \cdot CO$ — where $R^u$ has the meaning defined under (i). An example of such a group is phenoxyacetyl.

v. $R^u S \cdot CH_2 \cdot CO$ — where $R^u$ has the meaning defined above. Examples of such thio groups include S-phenylthioacetyl, S-chlorophenylthioacetyl and S-bromophenylthioacetyl.

vi. $R^u (CH_2)_n Z (CH_2)_m \cdot CO$ — where $R^u$ has the meaning defined above, n is an integer from 1–4, m is an integer from 1–5 and Z is an oxygen or sulphur atom. Examples of such groups include S-benzylthioacetyl, S-benzylthiopropionyl and S-phenethylthioacetyl.

vii. $R^u CO$ — where $R^u$ has the meaning defined above. Examples of such groups include benzoyl, substituted benzoyl (e.g., aminobenzoyl), 4-isoxazolyl- and substituted 4-isoxazolyl-carbonyl, and cyclopentanecarbonyl. Where the benzoyl group is substituted the substituents may, for example, be alkyl or alkoxy and may be in the 2- or 2- and 6- position; an example of such a group is 2,6-dimethoxy-benzoyl. Where the group $R^u$ represents a substituted 4-isoxazolyl group, the substitutents may be as set out under (i) above. An acyl group of this type is 3-o-chlorophenyl-5-methyl-isoxazol-4-yl-carbonyl.

viii. Amino acyl, for example $R^u{}'' CH(NH_2) \cdot (CH_2)_n CO$ — or $NH_2 \cdot Ar(CH_2)_n CO$— where n is an integer from 1–10, $R^u$ is a hydrogen atom or an alkyl, aralkyl or carboxy group or a group as defined under $R^u$ above, and Ar is an arylene group, e.g., p-phenylene or 1,4-naphthylene. Examples of such groups are disclosed in British Pat. No. 1,054,806. Groups of this type disclosed by the British Patent are p-aminophenylacetyl, $\alpha$-aminoacetyl, $\alpha$-amino-$\alpha$-methylacetyl, $\alpha$-amino-$\alpha$-phenylacetyl, $\beta$-aminopropionyl, $\beta$-amino-$\beta$-phenylpropionyl, L-$\gamma$-amino $\gamma$ -carboxybutyryl, 11-aminoundecylyl and dl-$\beta$-amino-$\beta$-carboxypropionyl groups. Other acyl groups of this type include those, e.g., $\delta$-aminoadipoyl, derived from naturally occurring amino acids.

(ix) 

where the groups $R^x$, which may be the same or different, are hydrogen atoms or monovalent organic groups, e.g., lower alkyl or halogen substituted lower alkyl.

x. Substituted glyoxylyl groups of the formula $R^y \cdot \overset{\alpha}{C}O \cdot CO$ — where $R^y$ is an aliphatic, araliphatic or aromatic group, e.g., an aromatic group having an atomic weight sum greater than 78, e.g., a thienyl group or a mono-, di-or tri-substituted phenyl group, the substituents being, for example, one or more halogen atoms (F, Cl, Br, or I), methoxy groups, methyl groups or amino groups, or a fused benzene ring. Included in this group are also the $\alpha$-carbonyl derivatives of the above glyoxylyl and substituted glyoxylyl groups, formed for example with hydroxylamine, semicarbazide, thiosemicarbazide, isoniazide or hydrazine.

xi. α-Substituted carboxylic acid acyl groups, where the α-substituent is an amino, substituted amino [e.g., acylamido or a group obtained by reacting the amino group and/or acylamido group(s) with an aldehyde or ketone e.g., acetone or methyl ethyl ketone], hydroxy, carboxy, esterified carboxy, cyano, halogeno, acyloxy (e.g., formyloxy or lower alkanoyloxy) or etherified hydroxy group. The carboxylic acid may be aliphatic, e.g., an α-substituted paraffinic acid, or araliphatic, e.g., an α-substituted phenylacetic acid. Acyl groups of this character include the group Ar CH(X)CO where Ar and X have the meanings defined below.

Salts which may be formed from the compounds according to the invention include (a) inorganic base salts such as alkali metal, e.g., sodium and potassium, alkaline earth metal e.g., calcium, and organic base salts e.g., procaine and dibenzylethylene diamine salts and (b) acid addition salts e.g., with hydrochloric, hydrobromic, sulphuric, nitric, phosphoric, toluene-p-sulphonic and methane sulphonic acids. The salts may also be in the form of resinates, formed e.g., with a polystyrene resin containing amino, quaternary amino, or sulphonic acid groups, or a resin containing carboxyl groups, e.g., a polyacrylic acid resin. The resin may if desired be cross-linked, e.g., it may be a copolymer of styrene and divinylbenzene containing the appropriate groups.

Compounds according to the invention which are particularly interesting as antibiotics are those of the formula

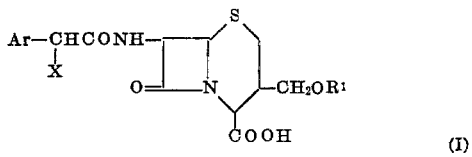

where Ar is an aromatic group e.g., phenyl or phenyl substituted with halo, hydroxy, lower alkyl, nitro, amino, lower alkanoyl, lower alkoxy or lower alkylmercapto, or a heterocyclic group, e.g., thien-2-yl or thien-3-yl, X is amino, substituted amino [e.g., acylamido or a group obtained by reacting the amino group and/or acylamido group(s) with an aldehyde or ketone e.g., acetone or methyl ethyl ketone], hydroxy, formyloxy or lower alkanoyloxy, and R¹ is a lower alkyl group, and non-toxic derivatives thereof. Of particular interest are the compounds of the formula (I) where the acid ArCH(X)COOH is of the D-series.

An important series of compounds according to the invention are the compounds having the general formula

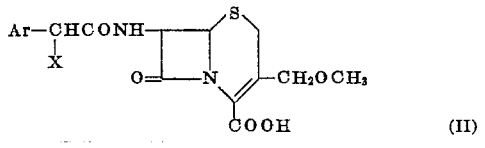

where Ar and X have the above defined meanings and non-toxic derivatives thereof.

A preferred compound according to the invention is 7β-(α-amino-α-phenylacetamido)-3-methoxymethylceph-3-em-4-carboxylic acid having the structure:

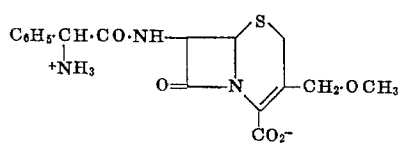

This compound, or a salt thereof, may be used as a mixture of diastereoisomers or as one of the pure diastereoisomeric forms. The derivative of D(-)phenyl-glycine and the salts of the derivative are especially preferred.

7β-(D-α-Amino-α-phenylacetamido)-3-methoxymethylceph-3-em-4-carboxylic acid is a broad-spectrum antibiotic being active against gram-positive and gram-negative organisms as evidenced by in vitro and animal tests. It is substantially resistant to degradation in vivo as evidenced by animal tests. A particularly significant property of this compound is that, when given by the oral route, it is well absorbed and gives good blood levels. It has an appreciable level of activity on oral administration. It will be appreciated that the property of absorption by the subject after oral administration is highly desirable.

Other important compounds according to the invention are those of the formula:

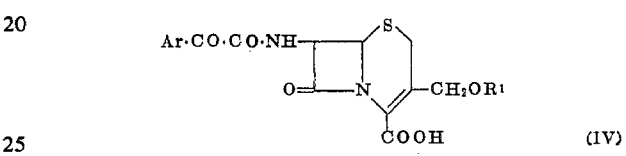

and base salts thereof, wherein Ar and R¹ have the above defined meanings.

The invention also provides novel derivatives useful in the preparation of the cephalosporin antibiotics according to the invention. Such derivatives include the 4-esters of 7β-acylamido-3-etherified hydroxymethylceph-3-em-4-carboxylic acids and the 7β-amino-3-etherified hydroxymethylceph-3-em-4-carboxylic acids and 4-esters thereof. An important class of 4-esters are those having a readily introducible and removable esterifying group, e.g., diphenylmethyl, t-butyl, β, β, β-trichloroethyl, silyl and stannyl groups. A particularly important series of intermediates are those having, as substituent at the 3-position, the methoxymethyl group.

The invention also provides a process for the preparation of a 7β-acylamido-3-etherified hydroxymethylceph-3-em-4-carboxylic acid or derivative thereof in which a 7β-acylamido-3-PCH₂-ceph-3-em-4-carboxylic acid or a derivative thereof, P being a group replaceable by an ether group, is reacted with an etherifying agent whereafter, if desired, the resulting 7β-acylamido-3-etherified hydroxymethylceph-3-em-4-carboxylic acid is N-deacylated to a 7 amino group is reacylated with the acylating agent of choice, the desired 7β-acylamido-3-etherified hydroxymethylceph-3-em-4-carboxylic acid being recovered.

The compounds according to the invention may thus be prepared by acylation of a 7β-amino-3-etherified hydroxymethylceph-3-em-4-carboxylic acid or derivative thereof or alternatively by conversion (direct or indirect) of a 7β-acylamido-3-hydroxymethyl (or 3-acetoxymethyl)-ceph-3-em-4-carboxylic acid or derivative thereof into a 3-etherified hydroxymethyl compound. Both methods have advantages and will now be described in more detail.

ACYLATION OF 7β-AMINO-3 ETHERIFIED HYDROXYMETHYLCEPH-3-EM-4-CARBOXYLIC ACIDS AND THEIR ESTERS

The acylation may be effected with any convenient acylation agent such as for example, an acid halide (e.g., chloride or bromide), an anhydride or mixed anhydride, e.g., with pivalic acid or formed with a haloformate, e.g., a lower alkyl-haloformate, or an active ester or azide; alternatively, the acid itself can be used, together with an esterifying agent, e.g., carbonyldiimidazole or a carbodiimide such as N,N'-diethyl-, -dipropyl-, or -diisopropylcarbodiimide, or preferably N,N'-dicyclohexylcarbodiimide.

The cephalosporin compound may be employed as the free 4—COOH compound, or as an ester with an alcohol or phenol which may readily be split off, e.g., by hydrolysis or reduction, at a later stage of the reaction, or as an acid addition salt, e.g., with nitric acid or a hydrocarbyl sulphonic acid or the free 4—COOH compound or ester thereof. Examples of hydrocarbyl sulphonic acids include alkylbenzene sulphonic acids, e.g., p-toluene sulphonic acid, and lower alkane sulphonic acids, e.g., methane sulphonic acid.

Alcohol and phenol residues which may readily be split off include those containing electron-attracting substituents for example, sulpho groups and esterified carboxyl groups. These groups may be split off by alkaline reagents but care should be exercised in using these reagents not to cause $\Delta^3 \rightarrow \Delta^2$ isomerization. Benzyl ester groups at the 4-position may be removed by hydrogenolysis although this may involve catalyst poisoning. A preferred method involves acid hydrolysis and groups which may be removed by acid hydrolysis include the adamantyl group and the residue of tertiary butyl alcohol, alkanols containing electron donors in the $\beta$-position such as acyloxy, alkoxy, halogen, alkylthio, phenyl, alkoxyphenyl, aromatic heterocyclic or tertiary butyl radicals. These radicals may be derived from alcohols such as p-methoxybenzyl alcohol, furfuryl alcohol, di-p-methoxyphenylmethanol, triphenylmethanol and diphenylmethanol or a reactive derivative thereof e.g., the bromide or diazo derivative. We particularly prefer to use compounds having inter alia a diphenylmethoxycarbonyl, a $\beta,\beta,\beta$-trichloroethoxycarbonyl or a t-butoxycarbonyl group at the 4-position because esters of this type do not appear to undergo appreciable $\Delta^3 \rightarrow \Delta^2$ isomerization under the conditions of reaction. An alcohol residue which may be split off by a reducing agent is that of $\beta,\beta,\beta$-trichloroethanol which may be removed by Zn/acetic acid.

Where the ester group at the 4-position is removed by acid hydrolysis, this may be effected by using trifluoroacetic acid preferably in conjunction with anisole or alternatively by using hydrochloric acid in admixture with acetic acid.

Other ester groups at the 4-position which can readily be removed include silyl and stannyl esters.

Stannyl esters are formed with tetravalent tin moieties, and the stannylating agent conveniently has the formula $R^9{}_3SnOSnR^9{}_3$, $R^9{}_3SnOH$, $R^9{}_3SnOCOR^9$, $R^9{}_3SnOR^9$, $SnR^9{}_4$, or $Sn(OR^9)_4$ where $R^9$ represents a hydrocarbon group, e.g., a lower alkyl, aryl, or aralkyl group. Tri-n-butyltin oxide is particularly preferred owing to its ready availability and low toxicity; triethyltin hydroxide is also particularly useful. Triloweralkyl tin halides, e.g., tributyltin chloride, may be reacted with an alkali metal, e.g., sodium, salt of a cephalosporanic acid to provide the required stannyl ester.

Silyl esters are formed with tetravalent silicon moieties, and the silylating agent conveniently is a silazane of the formula $R^4{}_3Si\cdot NR^4{}_2$, $R^4{}_3Si\cdot NH\cdot SiR^4{}_3$, $R^4{}_3Si\cdot NH\cdot COR^4$, $R^4{}_3Si\cdot NH\cdot CO\cdot NH\cdot SiR^4{}_3$, $R^4NH\cdot CO\cdot NR^4\cdot SiR^4{}_3$, or $R^4C(OSiR^4{}_3)$: $NSiR^4{}_3$ where the various groups $R^4$, which can be the same or different, represent hydrogen atoms or alkyl, aryl, or aralkyl groups. Some of these compounds may not be particularly stable under the reaction conditions where $R^4$ is H for all $R^4$ groups. It is generally preferred that the $R^4$ groups of the silazane should be hydrocarbon groups and preferably the hydrocarbon group should be methyl or phenyl as, for example, in hexamethyldisilazane, $(Me_3Si)_2NH$. When preparing the esters on a commercial scale it may be advantageous to employ silyl chlorides such as, for example, $Me_3SiCl$, in conjunction with a weak base such as, for example, $Et_2NH$ to give silylamines for example $Me_3Si\cdot NEt_2$. The reaction can be followed by measuring the amount of volatile amine or ammonia produced if such compounds are decomposition products. Silazanes which give rise to ammonia or volatile amines are preferred because the base is volatilized under the reaction conditions, thereby avoiding $\Delta^2$ isomerization which might otherwise occur. An inert gas is desirably passed through the reaction mixture to entrain volatile products and keep out moisture.

Silanes such as $R^4{}_3SiH$ where $R^4$ has the above-given meaning are not particularly suitable in this process since in general they are too reactive. Where the silylating agent is a halide, e.g., $Me_3SiCl$, causing formation of hydrogen halide during silylation, a weak base, e.g., pyridine, is desirably used as acid acceptor. Strong bases may cause isomerization of the cephalosporin derivative to the corresponding $\Delta^2$ compound.

At least 1 mole of organosilicon compound, is used, and an excess of up to 3 moles, is used to effect silylation. Undiluted organosilicon compounds may be employed as the reaction medium for the silylation or an inert diluent such as a hydrocarbon e.g., benzene, toluene or a xylene, or a halogenated hydrocarbon e.g., chloroform or methylene chloride may be used.

The silyl or stannyl ester group is easily split by exposing the derivative to an excess of a compound(s) containing active hydrogen, e.g., water, acidified or basified water, alcohols or phenols.

The acylation may be carried out in an aqueous medium, with an acid halide, for example in an aqueous solution of a water-miscilbe ketone such as acetone, or in an aqueous solution of tetrahydrofuran, preferably also in the presence of an acid binding agent for example sodium bicarbonate. The pH is preferably maintained at from 5 to 7 during the reaction which may be carried out at temperatures of from 0° to 25° C. The acylation may also be carried out in an organic solvent medium such as ethyl acetate by, for example, simple refluxing.

Alternatively the acylation may be effected with an acid halide or mixed anhydride under substantially anhydrous conditions in the liquid phase in an inert Lewis base (preferably one having a tertiary nitrogen atom) having a dielectric constant above 15 and preferably above 30 and containing a hydrogen halide acceptor. The dielectric constant of the base is advantageously within the range of 30–40 and the base is preferably N,N-dimethylacetamide or N,N-dimethylformamide. The reaction may be carried out on the free 4—COOH compound, on an ester thereof or on an acid addition salt e.g., the hydrogen p-toluenesulphonate of the 4—COOH compound or ester thereof. One may employ an acid addition salt of said ester under the aforesaid anhydrous conditions since this derivative can be obtained in high yield from the N-deacylation step. Thereafter, if desired, the ester group is removed. The acid halide is advantageously the chloride or bromide.

Methods of effecting acylation under substantially anhydrous conditions are described more fully in British Pat. No. 1,104,937.

PREPARATION OF 7$\beta$-AMINO-3-ETHERIFIED HYDROXYMETHYL-CEPH-3-EM-4-CARBOXYLIC ACIDS (A) AND 7$\beta$-ACYLAMIDO-3-ETHERIFIED HYDROXYMETHYL-CEPH-3-EM-4-CARBOXYLIC ACIDS (B)

Compounds (A) are required as starting materials in the acylation step described above and this preparation is conveniently described with that of compounds (B).

The 3-etherified hydroxymethyl compounds may be prepared from the corresponding 3-hydroxymethyl and 3-acetoxymethyl compounds.

General methods for the preparation of ethers are discussed by Meerwein in "Methoden der Organischen Chemie" edited by Müller, Georg Thieme Verlag, Stuttgart 1965, Vol. VI(3) pp 7–137 and in "The Chemistry of The Ether Linkage" edited by Patai, Interscience, London, 1967, especially at pp. 445–498 where methods involving the action of $H^+$, $OH^-$, Grignard reagents and peracids are discussed. Other methods involving the use of isoureas are discussed by Dabritz, *Angew. Chem.* 1966, 5, 470 and Vowinkel, *Chem. Ber.* 1967, 100, 16 and methods involving the use of alkyl phosphites are discussed by Chopard, *H.C.A;* 1967, 50, 1,021 and Harvey, *Tetrahedron,* 1966, 22 2,561. Whatever the method used one must remember that the use of high acid concentrations may result in the formation of lactones while the use of high base concentrations may result in fragmentation or isomerization of the cephalosporin molecule.

a. Direct displacement of acetoxy group in 3-acetoxymethyl by an alcohol or phenol group One method for preparing the compounds according to the invention comprises reacting the corresponding 3-acetoxymethyl compound in a polar medium with the appropriate alcohol or phenol so as to displace the acetoxy group and then recovering the desired 3-etherified hydroxymethyl compound.

The reaction may conveniently be effected by maintaining the reactants in solution at a temperature such as, for example, 15°–100° C. until the desired derivative is obtained in optimum yield. The reactants are advantageously employed in a ratio of about 1 molar equivalent of the 3-acetoxymethyl compound to 1–10 molar equivalents of the alcohol or phenol. The pH value of the reaction solution is advantageously maintained within the limits 5.0–8, preferably 6–7.

Since the reaction appears to proceed by a polar or ionic mechanism it is necessary to employ a polar medium for the reaction to proceed at a measurable rate. Although water may be used as the polar medium it may act as a competitive nucleophile and we prefer to use the alcohol or phenol itself as the solvent to preclude competitive reactions taking place. If the alcohol or phenol is not liquid at the reaction temperature it may be used in association with a polar solvent to bring it into solution.

Preferred alcohols are the lower alkanols and a particularly preferred lower alkanol is methanol.

The reaction product may be separated from the reaction mixture, which may contain, for example, unchanged cephalosporin and other substances, by a variety of processes including crystallization, ionophoresis, paper chromatography or by chromatography on ion-exchange resins.

b. Reaction of 3-hydroxymethyl group with etherifying agents

These compounds may also be prepared by reaction of the appropriate 3-hydroxymethyl compound with a diazo compound, e.g., a lower diazoalkane such as, for example, diazomethane, having first protected the 4-carboxyl group. With diazo reagents it is desirable to use mild conditions. The rate of reaction of the diazo compound is accelerated by the addition of a Lewis acid, e.g., boron trifluoride or aluminum trichloride especially when the reaction is effected in solution in ethanol. (See "Organische Chemie" by Müller, Kessler and Zeeh, Springer-Verlag, Berlin, 1966, 7, pp. 128–134). When using diazo compounds we prefer to protect the 4-carboxy group e.g. ,with a diphenylmethyl group and remove this later with trifluoroacetic acid, preferably in conjunction with anisole, at room temperature. Reaction with diazo compounds may be effected in halogenated hydrocarbons, e.g., dichloromethane or carbon tetrachloride, or an ether, e.g., diethyl ether, tetrahydrofuran or dioxan, or light petroleum fractions and the reaction may be effected at −15° to +50° C. preferably at about 5° C. taking care to ensure that the diazo compound does not add across the 3(4)-double bond. Such addition may be determined by ascertaining diminution of the absorption at 260 nm.

A still further method of preparing the ethers of the invention directly from the 3-hydroxymethyl compound comprises reacting a 4-ester (e.g., diphenylmethyl ester) of the 3-hydroxymethyl compound with an orthoester, e.g., (MC(OR)$_3$, where M is hydrogen, a lower alkyl group or the group OR, and R has the above-defined meaning, preferably in the presence of a Lewis acid catalyst e.g., perchloric acid, boron trifluoride or aluminium trichloride. This method enables a relatively wide range of ethers to be prepared.

c. Indirect preparation of ethers

Alternatively, etherification can be effected indirectly by first converting the 3-hydroxymethyl compound to a compound having at the 3-position the group —CH$_2$X such that the acid HX has a pKa of not more than 4.0, and preferably not more than 3.5 (as measured in water at 25° C.) and reacting the resulting 3-XCH$_2$-ceph-3-em-4-carboxylic acid ( or ester) with an alcohol or phenol so that the alcohol or phenol residue replaces the group X and the desired 3-etherified hydroxymethyl compound or its 4-ester is obtained.

This indirect reaction may be depicted as follows, taking for illustrative purposes only the preparation of 3-methoxymethyl-7β-(2'-thienylacetamido)-ceph-3-em-4-carboxylic acid starting from the known compound 3-hydroxymethyl-7β-(2'-thienylacetamido)-ceph-3-em-4-carboxylic acid:

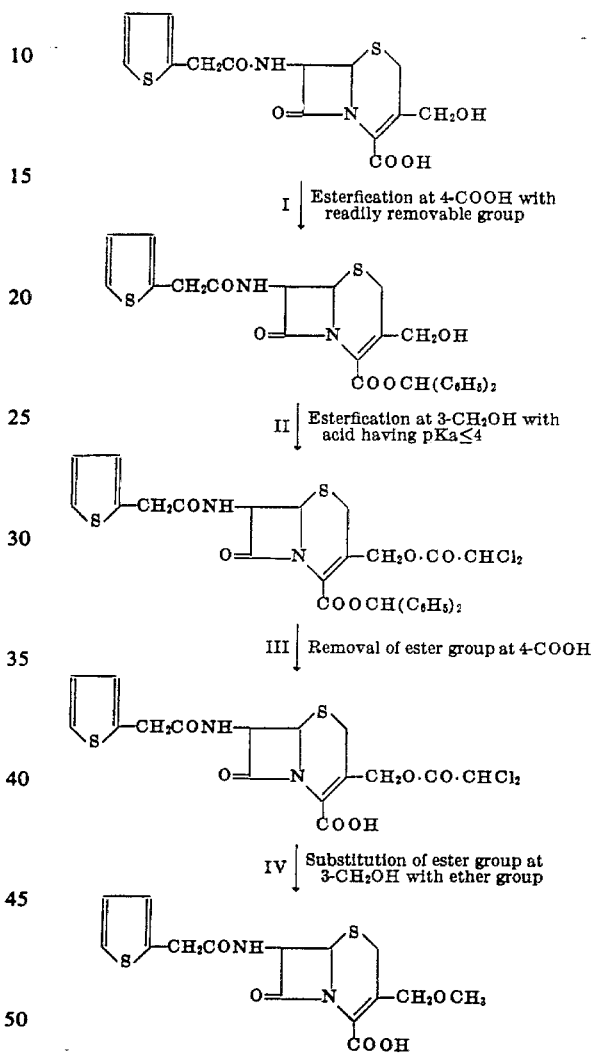

In Step (I) the 7β-acylamido-3-hydroxymethyl-ceph-3-em-4-carboxylic acid compound is first esterified with a group which is readily removable when desired. This may conveniently be achieved by reaction with diphenyldiazomethane. It should be noted when substituting some X groups by an ether group, that a 4-ester group is essential at that stage but when substituting other X groups by an ether group the presence of a 4-ester group is undesirable at that stage: this is explained in more detail below.

In Step II the resulting 7β-acylamido-3-hydroxymethyl-ceph-3-em-4-carboxylic acid ester is acylated with dichloroacetic acid to yield the desired 7β-acylamido-3-CH$_2$O·COCHCl$_2$-ceph-3-em-4-carboxylic acid ester.

After removal of the ester group on the 4-COOH group, e.g., in the case of diphenylmethyl by trifluoroacetic acid in conjunction with anisole in Step (III), the 3-CH$_2$O·CO·CHCl$_2$ group is reacted in Step (IV) with the chosen alcohol or phenol in a polar medium to yield a 3-etherified hydroxymethyl compound. If at this stage the 7β-acylamido group is not the group of choice this may be removed, e.g., as described below, and the resulting 7β-amino compound reacylated. Preferred alcohols are the lower alkanols and a particularly preferred lower alkanol is methanol.

The group X is preferably one of four main types, depending on whether a halogen atom, oxygen atom, sulphur atom or nitrogen atom is directly attached to the 3-methylene group, these four types of groups will be discussed in turn under the respective headings: halogens; oxygen leaving-groups; sulphur leaving-groups; and nitrogen leaving-groups. The selected acid HX should be chosen so that it has a pKa of not more than 4.0.

HALOGENS (X = Cl, Br, or I)

When X represents a halogen atom, we have found that the 4-carboxy group may or may not be esterified. Since esters are generally without substantial antibiotic activity, and moreover since the corresponding isomeric ceph-2-em-4-carboxylic acids are also generally without substantial antibiotic activity, it is desirable to use as esterifying group a group which can be readily introduced and removed without appreciable $\Delta^3 \to \Delta^2$ isomerization (which is known to be likely to occur in such reactions). Preferred esterifying groups include the diphenylmethyl, the β,β,β-trichloroethyl and t-butyl groups, the diphenylmethyl group can be readily introduced by means of diphenyldiazomethane, and removed by means of a mixture of tri-fluoroacetic acid and anisole at room temperature while the β,β,β-trichloroethyl group may be removed by means of zinc and acetic acid.

The 3-CH$_2$X compounds, where X represents Cl or Br, can be prepared from the corresponding 3-CH$_2$OH compounds (the 4-COOH group being esterified) by standard methods for the replacement of —OH by Cl or Br. For example, the 3-CH$_2$Cl compounds can be prepared from the corresponding 3-CH$_2$OH compounds by reaction with thionyl chloride, acid chlorides such as N,N-dialkyl- or N,N-diaryl-chlorosulphinamides, e.g., N,N-dimethylchlorosulphinamide, or alkyl chlorosulphites. The 3-CH$_2$Br compounds can be similarly prepared by reaction of the corresponding bromo-compounds with the 3-CH$_2$OH compounds or by reaction of the latter with PBr$_3$ and pyridine. The 3-CH$_2$I compounds may be prepared from the corresponding chlorides and bromides e.g., by reaction with an alkali metal iodide.

The 3-CH$_2$OH compounds can be prepared for example by hydrolysis of the corresponding 3-CH$_2$·O·COCH$_3$ compounds. The hydrolysis is preferably effected enzymatically, using, for example, wheat germ esterase or an esterase of the genus Rhizobium, as described in Belgian Pat. No. 671,692, or an esterase derived from orange peel, as described in British Pat. No. 966,222.

OXYGEN LEAVING-GROUPS

Another class of starting materials useful in the process according to the invention has the partial formula

Q—CH$_2$—O—

(where Q is the remainder of the cephalosporin molecule). This class includes ester of acetic acid derivatives having at least one electron-withdrawing substituent on the β-carbon atom, and esters of nuclear substituted benzoic acids, the nuclear substituent also being of the electron-withdrawing type. Thus the acid HX may be any of the various haloacetic acids (dichloroacetic acid being particularly preferred), methoxy-, alkylthio-, or cyanoacetic acid, glyoxylic acid, phenylpropiolic acid, a hemi-ester of malonic or oxalic acid, phenylglyoxylic acid, or a substituted phenylglyoxylic acid, the substituent(s) being for example one or more halogen atoms (F, Cl, Br, or I), methoxy groups or methyl groups. When the acid HX is a substituted benzoic acid, the choice of the substituent in the benzene ring will be influenced to some extent by a consideration of the stereochemistry of the benzoic acid HX. In general we prefer the phenyl group to be substituted in the 3- or 4- position rather than the 2-position since substitution at the 2-position gives rise to the maximum steric hinderance. Thus possible substituents include, for example, 4-methyl, 3- chloro or bromo, 3-, or 4- nitro or 3,5-dinitro, 3-, or 4-trifluoromethyl, 4-carbamoyl, 3-, or 4-(esterified carboxyl), or 3-, or 4-cyano.

The acid HX may also be formic acid.

When the group X contains a reactive center, e.g., an active chlorine atom as in a dichloroacetoxy group, the incoming nucleophile may attack at this center also. Under such circumstances, it is desirable to use a corresponding excess of the incoming nucleophile, e.g., two equivalents excess when dichloroacetoxy is displaced.

The starting materials having the partial formula

Q—CH$_2$—O—

(where Q is as hereinbefore defined) are conveniently prepared by acylation of a cephalosporanic acid derivative having a 3-hydroxymethyl group. The acylating agent is preferably a reactive derivative of an acid such as a keten (where this exists), an acid halide, e.g., a chloride or bromide, an anhydride or mixed anhydride, e.g., with pivalic acid or formed with haloformate, or an active ester or azide; alternatively, the acid itself can be used, together with an esterifying agent, e.g., carbonyldiimidazole or a carbodiimide such as N,N'-diethyl-, dipropyl-, or -diisopropyl-carbodiimide, or preferably N,N'-dicyclohexyl-carbodiimide.

The acylation should be effected under such conditions that both lactone formation and $\Delta^3 \to \Delta^2$ isomerization are substantially avoided. Lactone formation can be reduced by esterification of the 4-carboxy group before acylation. The esterifying group should be readily introducible and removable without resulting in $\Delta^3 \to \Delta^2$ isomerization. As mentioned above preferred protecting groups are the diphenylmethyl group and the β,β,β- trichloroethyl group which can be readily introduced and removed (after acylation of the 3-CH$_2$OH group) substantially without $\Delta^3 \to \Delta^2$ isomerization.

The esterifying group is preferably removed before the cephalosporanic acid derivative is reacted with the incoming nucleophile.

SULPHUR-LEAVING GROUPS

Yet another group of preferred starting materials can be represented by the partial formula

Q—CH$_2$—S—

(where Q is as hereinbefore defined). The acid HX is preferably derived from a thiourea (the pKa of a protonated thiourea being generally about −1). The acid HX can also be a thiocarboxylic acid, especially an aromatic or heterocyclic thiocarboxylic acid, a dithiocarbamic acid, or an aliphatic or aromatic thioamide. The preparation of these starting materials is described in British Pats. Nos. 1,012,943 and 1,059,562 and in Belgian Pat. No. 650,444.

NITROGEN LEAVING-GROUPS

A further class of starting materials useful in the process according to the invention has the partial formula

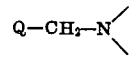

(where Q is as hereinbefore defined), a preferred group of compounds of this type being isothiocyanates having the formula

Q—CH$_2$—N=C=S

It is desirable that the 4-carboxy group should not be esterified but be present as COO$^-$ or COOH when X represents an oxygen, nitrogen, or sulphur leaving group.

REACTION CONDITIONS FOR THE SUBSTITUTION OF X BY AN ETHER GROUP

The reaction may conveniently be effected by maintaining the reactants in solution at a moderate temperature, e.g., 0°–120 C., preferably 35°–75° C., advantageously about 50° C. Reactions are usually complete (in aqueous solvents) in about 15 min at 50°, and in correspondingly longer times at lower temperatures or correspondingly shorter times at higher temperatures. The reaction is advantageously effected using from 1 molar equivalent to 10 molar equivalents of incoming nucleophile. The pH value of the reaction solution under aqueous conditions is advantageously maintained within the limits 5–8, preferably 6–7. If necessary the pH of the solution should be adjusted to the desired value by the addition of a buffering agent such as sodium acetate. When working under non-aqueous conditions, the reaction medium should be neither extremely basic nor extremely acidic.

Since the reaction appears to proceed by a polar or ionic mechanism it is desirable to employ a polar medium for the reaction to proceed. The most generally suitable is water but organic solvents such as formamide, dimethylformamide or acetone may be employed. The organic solvents may be used in the presence or absence of water.

Where essentially non-aqueous conditions are used the alcohol or phenol may itself be used as the reaction medium and this is advantageous in that the absence of water from the reaction medium precludes a competitive reaction between the water and the cephalosporin molecule taking place. Non-polar solvents may also be used, in which cases the addition of as little as 0.5 percent of water will often bring about the desired amount of polarity.

Organic media which may be used include lower alkanoic acid nitriles e.g., acetonitrile or propionitrile; halogenated hydrocarbons e.g., methylene chloride, carbon tetrachloride, chloroform, ethylene dichloride or perchloroethylene; lower nitroalkanes, e.g., nitromethane; nitro-aromatic compounds, e.g., nitrobenzene; cyclic ethers e.g., dioxan or tetrahydrofuran; amides of the general formula $R^5 \cdot CO \cdot NR^6 \cdot R^7$ where $R^5$ is a hydrogen atom or an alkyl group containing one to five carbon atoms and $R^6$ and $R^7$, which may be the same or different, are each a hydrogen atom or an alkyl group containing one to five carbon atoms, or, alternatively $R^6$ and $R^7$ together form a divalent aliphatic group which, together with the adjacent nitrogen atom, forms a heterocyclic ring. Examples of amides of this type are N,N-dimethylformamide, N,N-diethylformamide, N,N-dimethylacetamide, formamide and N-methylformamide. Other solvents which may be used include N-lower alkyl pyrrolidones e.g., N-methylpyrrolidone and di-lower alkyl sulphoxides, e.g., dimethylsulphoxide.

The reaction medium need not be liquid at room temperature. Solids, e.g., acetamide may be used so long as they are liquid at the reaction temperature.

The reaction product may be separated from the reaction mixture, which may contain, for example, unchanged cephalosporin and other substances, by a variety of processes including recrystallization, ionophoresis, paper chromatography or by chromatography on ion-exchange resins.

When the acid HX has a pKa of from 1 to 4 (especially when X is the residue of a sulphur nucleophile), the replacement of X by the incoming alcohol or phenol may require the assistance of a salt of mercury, silver, or gold, preferably mercury. The reaction conditions are generally as set out in British Patent No. 1,101,424.

d. Reaction of 3-hydroxymethyl group with unsaturated compounds

Ethers may also be formed from a 3-hydroxymethyl compound by addition to unsaturated compounds activated by electron donating groups or electron attracting groups. In the case of the unsaturated compounds containing electron donating groups, geminal addition occurs, this being favored by acid catalysts. On the other hand with unsaturated compounds containing electron attracting groups, non-geminal addition occurs, this being favored by basic catalysts.

Where the final product is a 7β-acylamido compound not having the desired acyl group, the 7β-acylamido compound may be N-deacylated to yield the corresponding 7β-amino compound and the latter acylated with an appropriate acylating reagent.

Methods of N-deacylating cephalosporin C derivatives having 7β-acylamido groups are known and one suitable method comprises treating a 7β-acylamido-3-etherified hydroxymethyl-ceph-3-em-4-carboxylic acid ester with an imide-halide forming component, converting the imide halide so obtained into the imino ether and hydrolyzing the latter. If desired, the ester group may be split off by hydrolysis or hydrogenolysis to yield the 4-carboxylic acid. Suitable readily removable ester groups are described above.

Suitable imide halide forming components include acid halides derived from the phosphorus acids, the preferred compounds being the chlorides such as, for example, phosphorus oxychloride or phosphorus pentachloride.

The reaction with the imide halide forming component may be carried out in the presence of an organic or inorganic base. Suitable organic bases include tertiary amines such as, for example, triethylamine, pyridine or dimethylaniline while calcium carbonate is an example of a suitable inorganic base. Calcium carbonate is a useful base for this reaction in that it does not promote $\Delta^3 \rightarrow \Delta^2$ isomerization.

The imide halide forming component may, if desired, be added to the 7β-acylamido-3-etherified hydroxymethyl-ceph-3-em-4-carboxylic acid or 4-ester thereof in the form of a solution. Preferably the solution should be in an inert organic solvent such as a chlorinated hydrocarbon e.g., methylene chloride.

The imide halide may be converted into the imino ether by reacting with an alcohol, preferably a lower alkanol, in the presence of a tertiary amine as described above and the imino ether may be decomposed by using water or a lower alkanol e.g., methanol, in the presence of a basic or acidic catalyst. Acidic catalysts which may be used include mineral and organic acids such as hydrochloric acid, trifluoroacetic acid and paratoluenesulphonic acid. Suitable basic catalysts include ammonia and salts of weak acids with an alkali metal or alkaline earth metal.

This method of N-deacylation is described in greater detail in copending application filed on even date.

N-Deacylation of a 7β-acylamido-3-etherified hydroxymethylceph-3-em-4-carboxylic acid or derivative thereof may also be effected by direct acid hydrolysis e.g., with 0.1N to N hydrochloric acid.

When the substituent at the 7β-amino group is a δ-aminoadipoyl group the N-deacylation may be effected by the action of nitrosyl chloride as described in British Pat. No. 1,017,534.

Where the starting compound is a 7β-amino compound, it may be necessary to protect the 7β-NH₂ group during the various reaction steps. This can be done, as described above, by acylation or alternatively, by means of another readily removable group which can be removed at a convenient point.

7β-Amino-3-etherified hydroxymethylceph-3-em-4-carboxylic acids and acid addition salts, e.g., salts with strong acids, base salts and 4-esters thereof are novel as stated above. Acid addition salts with hydrocarbyl sulphonic acids, e.g., p-toluene-sulphonic acid and methane sulphonic acid, and nitric acid can be readily acylated as described in British Pat. No. 1,104,937.

The resulting 7β-amino compound e.g., in the form of an acid addition salt may be re-acylated e.g., as described above.

When the 7β-acylamido group contains an amino group it will be necessary to protect this during the various reaction stages. The protecting group is conveniently one which can be removed by hydrolysis without effecting the rest of the molecule, especially the lactam and 7β-amido linkages. The same or a different protecting group may also be used to protect the 4-COOH group and both groups can be simultaneously removed as desired. An advantageous procedure is to remove both groups at the last stage in the sequence. Preferred types of protected groups are of the urethane, arylmethyl (e.g., trityl), arylmethylene, sulphenyl or anamine types. Such groups can in general be removed by one or more reagents selected from dilute mineral acids, e.g., dilute hydrochloric acid, concentrated organic acids, e.g., concentrated acetic acid, trifluoroacetic acid, and liquid hydrogen bromide at very low temperatures, e.g., −80° C. A convenient protecting group is the tertiary butoxycarbonyl group, which is readily removed by hydrolysis with dilute mineral acid, e.g., dilute hydrochloric acid, or preferably with aqueous weak acid, for example, an organic acid, e.g., acetic acid or other aliphatic acid, e.g., at a temperature of 0°–40° C., preferably at room temperature (15°–25° C). An alternative hydrolyzing agent is trifluoroacetic acid. The $NH_2$ group may also be protected as $NH_3^+$ by using the amino acid halide as its hydrohalide under conditions in which the amino group remains protonated.

Typical protecting groups and their methods of removal are illustrated in the following table:

dose presentation form, and may contain conventional excipients such as binding agents, for example, syrup, acacia, gelatin, sorbitol, tragacanth, or polyvinylpyrrolidone; fillers, for example lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets may be coated according to methods well known in the art. Oral liquid preparations may be in the form of aqueous or oily suspensions, solutions, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin,

| Type | Example | Usual name and analogues, etc. | Usual method of removal |
|---|---|---|---|
| Urethane | HN-COOCH$_2$Ph | Benzyloxycarbonyl, p-methoxy | HBr/AcOH (neat); CF$_3$COOH (neat); Liq. HBr at −80° C. |
| Do | HN-COOC(CH$_3$)$_3$ | t-Butoxycarbonyl | Dil. acid (HCl); CF$_3$COOH (neat). |
| Do | HN-COOCHPh$_2$ | Diphenylmethoxycarbonyl | CF$_3$COOH (neat); Dil. HCl etc. |
| Do | HN-COO—(1-adamantyl) | 1-adamantyloxycarbonyl | Dil. HCl. |
| Arylmethyl | HN-CPh$_3$ | Trityl | AcOH + H$_2$O; Dil. HCl. |
| Sulphenyl | HN–S–(o-NO$_2$-phenyl) | o-Nitrophenylsulphenyl, p-nitro | Dil. HCl; NaI or; N$_2$S$_2$O$_3$; pH 2–4. |
| Enamine | (β-ketoenamine structure) | β=Dicarbonyl; R=OEt Ethyl acetoacetate; R=CH$_3$ Acetylacetone; R=Ph Benzoylacetone; R=OMe Methyl acetoacetate; R=C$_2$H$_5$ Propionylacetone; and many other β-diketones. | Acid labile in varying degree; Dil. AcOH or HCl, etc. |
| Arylmethylene | N=CH–(2-HO-phenyl) | Anil (similar to β-dicarbonyl) from salicylaldehyde; 5-chloro-salicylaldehyde; 3,5-dichlorosalicylaldehyde; 2-hydroxy-1-naphthaldehyde; 3-hydroxy-pyridine-4-aldehyde. | Dil. HCl; formic acid. |
| Onium | NH$_3^+$ | | Base. |
| Urethane | HN-CO-OCH$_2$CCl$_3$ | β,β,β-Trichloroethoxycarbonyl | Reducing agents e.g. Zn/acetic acid. |

The compounds according to the invention may be formulated for administration in any convenient way, by analogy with other antibiotics and the invention therefore includes within its scope a pharmaceutical composition comprising a 7β-acylamido-3-etherified hydroxymethylceph-3-em-4-carboxylic acid or a non-toxic derivative e.g., salt thereof (as herein defined) adapted for use in human or veterinary medicine. Such compositions may be presented for use in conventional manner with the aid of any necessary pharmaceutical carriers or excipients.

The invention therefore provides pharmaceutical compositions comprising a 7β-acylamido-3-etherified hydroxymethylceph-3-em-4-carboxylic acid or a non-toxic salt thereof (as herein defined) in association with a pharmaceutical carrier or excipient. The compositions are preferably presented in a form suitable for absorption by the gastro-intestinal tract. Tablets and capsules for oral administration may be in unit dose presentation form, and may contain conventional excipients such as binding agents, for example, syrup, acacia, gelatin, sorbitol, tragacanth, or polyvinylpyrrolidone; fillers, hydroxyethylcellulose, carboxymethyl cellulose, aluminum stearate gel or hydrogenated edible fats; emulsifying agents, for example, lecithin, sorbitan mono-oleate or acacia; non-aqueous vehicles which may include edible oils, for example, almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g., cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulatory agents such as suspending, stabilizing and/or dispersing agents. Alternatively the active ingredient may be in powder form for reconstitution with a suitable vehicle, e.g., sterile, pyrogen-free water, before use.

The compositions may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules, in liquid or semi-solid form, or may be used as drops etc. Topical applications may be formulated in hydrophobic or hydrophilic bases as ointments, creams, lotions, paints, powders etc.

For veterinary medicine the composition may, for example, be formulated as an intramammary preparation in either long acting or quick-release bases.

The compositions may contain from 0.1 percent upwards, e.g., 10–99 percent, preferably from 10–60 percent of active material, depending on the method of administration. Where the compositions comprise dosage units, each unit will preferably contain 50–500 mg. of the active ingredient. The dosage as employed for adult human treatment will preferably range from 100–3,000 mg. for instance 1,500 mg. per day, depending on the route and frequency of administration.

The compounds according to the invention may be administered in combination with other therapeutic agents such as antibiotics, for example other cephalosporins, the penicillins or tetracyclines.

In order that the invention may be well understood the following examples are given by way of illustration only. In the examples:

System A is descending n-propanol:water = 7:3 on Whatman No. 1 paper at room temperature.

System B is n-butanol:ethanol:water = 4:1:5, equilibrated at room temperature; descending manner with upper phase as developer in equilibrium with lower phase. Whatman No. 3MM paper buffered to pH 6.0 with 0.05 M sodium dihydrogen phosphate.

System C is ethyl acetate: n-butanol:0.1M sodium acetate (pH 5.0), equilibrated at 38°; descending manner with upper phase as developer in equilibrium with lower phase and run at 38° No. 1 Whatman paper buffered to pH 5.0 with 0.1 M sodium acetate.

$R_T$ represents the $R_F$ value divided by that of 3-acetoxymethyl-7β-(2'-thienylacetamido)ceph-3-em-4-carboxylic acid.

$R_P$ represents the $R_F$ value divided by that of 3-acetoxymethyl-7β-phenylacetamidoceph-3-em-4-carboxylic acid.

The conditions for electrophoresis are those described by Cocker et. al., *J. Chem. Soc.*, 1965, 5,015.

EXAMPLE 1

The reaction between 3-acetoxymethyl-7β-(2'-thienylacetamido)-ceph-3-em-4-carboxylic acid and n-propanol A solution of 3-acetoxymethyl 7β-(2'-thienylacetamido)-ceph-3-em-4-carboxylic acid (0.5 g.) in n-propanol (20 ml.) was heated under reflux. Samples (10 μl) were taken at hourly intervals and spotted alongside authentic 3-n-propoxymethyl-7β-(2'-thienylacetamido)-ceph-3-em-4-carboxylic acid on Whatman No. 1 paper which had been previously buffered at pH 5 with 0.1 M sodium acetate solution. The chromatogram was run in System C. Ultraviolet light revealed three spots on the completed chromatogram, $R_f$ 0.27, 0.56 and 0.90. The first was unreacted starting material and the second corresponded to 3-n-propoxymethyl-7β-(2'-thienylacetamido)-ceph-3-em-4-carboxylic acid. This spot was cut out and eluted with 20 percent-aqueous ethanol and the concentration determined from the absorbance at 260 nm. ($E_{1cm.}^{1\%}$ of authentic material = 220, see Example 11. The maximum yield (10 percent) of product was obtained after 2 hours.

EXAMPLE 2

Preparation of 3-methoxymethyl-7β-(2'-thienylacetamido)-ceph-3-em-4-carboxylic acid The title compound was prepared via the following reaction scheme (the steps are described in more detail below).

3-Hydroxymethyl-7β-(2'-thienylacetamido)-ceph-3-em-4-carboxylic acid
↓ (a)
Diphenylmethyl 3-hydroxymethyl-7β-(2'-thienylacetamido)-ceph-3-em-4-carboxylate
↓ (b)
Diphenylmethyl 3-methoxymethyl-7β-(2'-thienylacetamido)-ceph-3-em-4-carboxylate
↓ (c)
3-Methoxymethyl-7β-(2'-thienylacetamido)-ceph-3-em-4-carboxylic acid.

a. Diphenylmethyl 3-hydroxymethyl-7β(2'-thienylacetamido)ceph-3-em-4-carboxylate 3-Hydroxymethyl-7β-(2'-thienylacetamido)ceph-3-em-4-carboxylic acid (500 mg.) was dissolved in dry tetrahydrofuran and treated with a solution of diphenyldiazomethane (300 mg., 1.1 equiv.) in petrol. Nitrogen was evolved slowly, and after 2½ hours the solution was evaporated, the residue dissolved in ethyl acetate, and the solution was washed with bicarbonate solution and re-evaporated. This gave a gum which solidified on trituration with ether (0.5 g.). A sample was recrystallized from methanol, m.p. 164°, $[\alpha]_D^{23} = +25°$ (c, 1.0, dioxan), +22° (c 1.0, tetrahydrofuran). $\lambda\lambda_{max}$. ethanol 234 nm, $E_{1 cm.}^{1\%} = 255$, ($\epsilon = 13,300$, 259 nm, $E_{1 cm.}^{1\%} = 151$ ($\epsilon$ 7,850), $\nu_{max}$. (bromoform) 3,420 (OH), 3,280 (NH), 1,750 (β-lactam), 1,722 cm$^{-1}$ (COOR). (Found, C, 62.2; H, 4.5; N, 5.4; S, 12.1. $C_{27}H_{24}N_2O_5S_2$ requires C, 62.3; H, 4.7; N, 5.4; S, 12.3 percent) $R_F = 0.83$ (Kieselgel G plates; ethyl acetate:benzene = 1:2.)

b. Diphenylmethyl 3-methoxymethyl-7β-(2'-thienylacetamido)-ceph-3-em-4-carboxylate Diphenylmethyl 3-hydroxymethyl-7β-(2'-thienylacetamido)-ceph-3-em-4-carboxylate (20 g., 38.4 mmole.) was dissolved in dry methylene chloride (1,500 ml.) and treated with boron triflouride etherate (0.3 ml., 2mmole.). A solution of diazomethane (from 40 g. nitrosomethylurea) in ether (1,500 ml.) was added at 0°. The solution was kept at room temperature for 1 hour, when it was filtered through a pad of silica acid, which was finally well washed with ethyl acetate. The solvent was evaporated and the resulting foam dissolved in ethanol (100 ml.) from which the title compound separated as a white crystalline solid (14.3 g., 68 percent), m.pt. 146°–148° $[\alpha]_D^{25°} = 15.6°$ (c 1, tetrahydrofuran), $\lambda\lambda_{max}$ (ethanol) 235 and 260 nm. ($\epsilon$ 14.800 and 9,100 resp.) (both shoulders), $\nu_{max}$ (Nujol) 3,295 (—NH), 1,786 (β-lactam), 1,725, 1,230 (—COOR), 1,668 and 1,646 (—CONH—) cm$^{-1}$. (Found: C, 63.1; H, 4.9; N, 5.1; S, 11.5. $C_{28}H_{26}N_2O_5S_2$ requires: C, 62.9; H, 4.9; N, 5.2; S, 12.0 percent), N.M.R. (CDCl$_3$) 5.76 (—CH$_2$OCH$_3$), 6.80τ(—CH$_2$OCH$_3$). A parallel reaction using 5 percent anhydrous aluminum trichloride in ether (5.3 ml. 2 mmole), in place of the boron trifluoride etherate, gave approximately the same yield.

c. 3-Methoxymethyl-7β-(2'-thienylacetamido)-ceph-3-em-4-carboxylic acid

A solution of the diphenylmethyl ester from Example 2(b) (2 g., 3.8 mmole) in anisole (2 ml.) and trifluoroacetic acid (8 ml.) was kept for 5 minutes at room temperature, and the volatile reagents were then evaporated off below 30°. A solution of the residual gum in ethyl acetate was poured into light petroleum to give a white solid, which was redissolved in ethyl acetate (4 ml.), and ether (20 ml.) was added. The precipitate was discarded. The clear filtrate was poured into a large volume of petroleum ether, giving a white solid (1.0 g., 71 percent), of the title compound, which crystallized from ethyl acetate as colorless needles, m.pt. 153°–7° (decomp.), $[\alpha]_D^{23}$ + 82° (c 1.0, tetrahydrofuran), $\lambda_{max}$ (ethanol) 237 nm. ($\epsilon$ 13,700), inflexion 260 nm ($\epsilon$ 7,700); $\nu_{max}$ (Nujol) 1,782 (β-lactam), 1,725 (CO$_2$H), 1,670 and 1,540 (amide); τ(D$_2$O with NaHCO$_3$) 6.7, 6.73, 6.38, 6.1, 5.8, 4.88, 4.38 and 2.62 to 2.95; $R_f$ 0.25 (system B), 0.22 (system C). (Found: C, 49.2; H, 4.6; N, 7.5; S, 17.0 $C_{15}H_{16}N_2O_5S_2$ requires C, 48.9; H, 4.4; N, 7.6; S, 17.4 percent

EXAMPLE 3

Preparation of Sodium 7β-(2',2'-dimethyl-5'-oxo-4'-phenyl-1'-imidazolidinyl)-3-methoxymethyl-ceph-3-em-4-carboxylate The title compound was prepared via the following reaction scheme (the steps are described in more detail below).

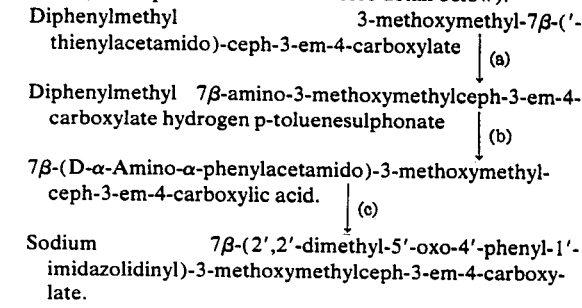

a. Diphenylmethyl 7β-amino-3-methoxymethylceph-3-em-4-carboxylate hydrogen p-toluenesulphonate A solution of diphenylmethyl-3-methoxymethyl-7β-(2'-thienylacetamido)-ceph-3-em-4-carboxylate (4.0 g., 7.65 mmole.) in methylene chloride (60 ml.) was cooled to −10° and treated with pyridine (7.5 ml., 95 mmole.). A solution of phosphorus pentachloride (4.7 g., 22.6 mmole.) in methylene chloride (70 ml.) was added with stirring over 5 minutes, the temperature being maintained at −10°. The stirring was continued for 30 minutes. Cold methanol (75 ml.) was then added at such a rate that the temperature did not rise above −10°. Stirring was continued for 2½ hours at room temperature. N-hydrochloric acid (105 ml.) was then added and the mixture stirred at room temperature for 1 hour. The organic layer was separated, washed with aqueous sodium bicarbonate and water, and then evaporated. The residue was dissolved in ethyl acetate (20 ml.) and a solution of p-toluenesulphonic acid (1.45 g., 7.65 mmole.) in ethyl acetate added. The title compound separated as a white crystalline solid which was filtered, washed with ethyl acetate, and dried (3.0 g., 67 percent). This material could be recrystallized from chloroform-ethyl acetate, m.pt. 150°, $[\alpha]_D^{25°} = -8.3°$ (c 1, chloroform), $\lambda_{max}$ (ethanol) 262 nm. ($\epsilon$7,750), $\nu_{max}$ (Nujol) 1,788 (β-lactam), 1,732 and 1,230 (—COOR) cm.$^{-1}$ (Found: C, 58.7; H, 5.0; N, 4.6; S, 10.6. $C_{29}H_{30}N_2O_7S_2$ requires: C, 58.9; H, 5.3; N, 4.7; S, 10.8 percent), N.M.R. (CDCl$_3$) 5.50 and 5.83 (quartet; J = 15 c/s, —CH$_2$OCH$_3$), 6.86$\tau$(—CH$_2$OCH$_3$).

b. 7β-(D-α-Amino-α-phenylacetamido)-3-methoxymethyl-ceph-3-em-4-carboxylic acid

N-(tert-butoxycarbonyl)-D-phenylglycine (1.85 g., 7.72 mmole.) was dissolved in dry tetrahydrofuran (20 ml.) and the solution cooled to −6°. Triethylamine (1.09 ml., 7.72 mmole.) was added followed by a solution of isobutyl chloroformate (1.06 g., 7.72 mmole.) in dry tetrahydrofuran (4 ml.) at such a rate that the temperature remained below −6°. After stirring for 30 minutes at room temperature, the triethylammonium chloride was filtered off. The filtrate was added to a solution of diphenylmethyl 7β-amino-3-methoxymethylceph-3-em-4-carboxylate-hydrogen p-toluene sulphonate (3.0 g., 5.1 mmole.) in acetonitrile (15 ml.) and N,N-dimethylacetamide (5 ml.). After 30 minutes the solvents were removed under reduced pressure and the residue dissolved in ethyl acetate. The solution was extracted with saturated aqueous sodium bicarbonate and water, then dried and the solvent evaporated. The gum was dissolved in a mixture of anisole (3 ml.) and trifluoroacetic acid (12 ml.) and after 5 minutes the solution evaporated under high vacuum. The oil was dissolved in ethyl acetate and the solution poured into a large volume of 60°–80° light petroleum. The product was filtered, dried, and suspended in water (200 ml.). The suspension was treated with "Amberlite" LA1 (AcO$^-$) (20 percent v/v in ether, 50 ml.) and well shaken; the emulsion which formed was separated by centrifuging. The aqueous layer was washed with ethyl acetate (3 × 40 ml.) and freeze-dried. The white freeze-dried solid (1.4 g., 72 percent) was crystallized from aqueous propanol, m.pt. 248°–260° (d) $[\alpha]_D = +100°$ (c 1, water), $\lambda_{max}$ (water) 260 nm. ($\epsilon$ 8,100), $\nu_{max}$ (Nujol) 1,756 (β-lactam, 1,512 and 1692 (—CONH—), 1,587 (—C—O—O$^-$) cm.$^{-1}$, (Found: C, 52.9; H, 5.1; N, 10.5; S, 8.1. $C_{17}H_{19}N_3O_5S$. ½H$_2$O requires: C, 52.8; H, 5.2; N, 10.9; S, 8.2 percent). N.M.R. (D$_2$O) 2.41 (phenyl), 5.71, 6.68 $\tau$(—CH$_2$OCH$_3$), R$_f$ = 0.09 (system B); this substance moved to the anode on electrophoresis at pH 1.9.

c) Sodium 7β-(2',2', -dimethyl-5'-oxo-4'-phenyl-1'-imidazolidinyl)-3-methoxymethylceph-3-methoxymethyl-ceph-3-em-4-carboxylate A suspension of 7β-(D-α-amino-α-phenylacetamido)-3-methoxymethylceph-3-em-4-carboxylic acid (1 g., 2.65 mmole.) in 1 percent-triethylamine in acetone (37 ml., 2.65 mmole. tri-ethylamine) was stirred at room temperature for 15 hours. 10 percent -Sodium 2-ethylhexanoate in acetone (4.5 ml.) was added and the precipitate filtered and washed with acetone and ether (0.65 g., 59 percent), $\lambda_{max}$. (water) 257 nm ($\epsilon$7,700), $\nu_{max}$. (Nujol) 1,760 (β-lactam), 1,690 (—CONH—), 1,610 (—COO$^-$) cm.$^{-1}$; N.M.R. (D$_2$O) 8.44 (>C(CH$_3$)$_2$), 5.78, 6.69 $\tau$ (—CH$_2$OCH$_3$). Found: C, 51.8; H, 5.1; N, 9.2; S, 6.5. $C_{20}H_{22}N_3NaO_5S$.1½H$_2$O requires C, 51.5; H, 5.4; N, 9.0; S, 6.9 percent.

EXAMPLE 4

7β-(p-Fluorophenylacetamido)-3-methoxymethylceph-3-em-4-carboxylic acid.

Prepared by acylation of diphenylmethyl-7β-amino-3-methoxymethylceph-3-em-4-carboxylate hydrogen p-toluene sulphonate (1.1 g., 1.89 mmole.) by the general procedure already described in Example 3(b) with p-fluorophenylacetyl chloride (0.35 g., 2.0 mmole.); yield (0.60 g., 92 percent). The product was crystallized from aqueous ethanol as colorless needles, m.pt. 182°–183°, $[\alpha]_D^{25°}$=93° (c 1, tetrahydrofuran), $\lambda\lambda_{max}$. (ethanol) 264, 271 nm. ($\epsilon$7,450, 6,850 resp.), $\nu_{max}$. (Nujol) 3,250 (—NH—), 1,766 (β-lactam), 1,730 and 1,250 (—OCOCH$_3$), 1,705 (—COOH), 1,655, 1,545 (—CONH—) cm.$^{-1}$ (Found: C, 48.5; H, 4.8; N, 6.7; S, 7.9. $C_{17}H_{17}FNB2O_5S.2¼H_2O$ requires: C, 48.5; H, 5.1; N, 6.7; S, 7.6 percent), N.M.R. (D$_2$O with NaHCO$_3$) 5.8, 6.7 $\tau$ (—CH$_2$OCH$_3$), R$_f$0.36 (System B), 0.46 (System C).

EXAMPLE 5

7β-(p-Acetoxyphenylacetamido)-3-methoxymethylceph-3-em-4-carboxylic acid

Prepared by acylation of diphenylmethyl 7β-amino-3-methoxymethylceph-3-em-4-carboxylate hydrogen p-toluene sulphonate (1.05 g., 1.8 mmole.) with p-acetoxyphenylacetyl chloride [prepared from the corresponding acid (1 g., 4.8 mmole.) and oxalyl chloride] by the general procedure described in Example 3(b). Yield (1.0 g., 92 percent). This product crystallized from aqueous ethanol as colorless needles m.p. 150°–152°, $[\alpha]_D^{25°}$=84.3° (c 1, tetrahydrofuran), $\lambda_{max}$. (ethanol) 261 nm. ($\epsilon$7,300), $\lambda_{max}$. (Nujol) 3,250 (—NH—), 1,775 (β-lactam), 1,730, 1,242 (—OCOCH$_3$), 1,708 (—COOH), 1,650 and 1,550 (—CONH—) cm.$^{-1}$ (Found: C, 52.4; H, 4.6; N, 6.5; S, 7.0. $C_{19}H_{20}N_2O_7S.¾H_2O$ requires: C, 52.6; H, 5.0; N, 6.5; S, 7.4 percent), N.M.R. (D$_2$O, with NaHCO$_3$) 7.63 (CH$_3$COO), 5.79, 6.70$\tau$(—CH$_2$OCH$_3$) R$_f$ 0.30 (system B), 0.27 (system C).

EXAMPLE 6

7β-(p-Chlorophenylglyoxamido)-3-methoxymethylceph-3-em-4-carboxylic acid

Prepared by acylation of diphenylmethyl-7β-amino-3-methoxymethylceph-3-em-4-carboxylate hydrogen-p-toluene-sulphonate (2.5 g., 4.3 mmole.) with the mixed anhydride from p-chlorophenylglyoxylic acid (1.15 g., 6.4 mmole.) and pivaloyl chloride, by the general procedure described in Example 3(b). Yield (1.5 g., 85 percent), m.pt. 154°–156°, $[\alpha]_D^{25°}$ = 98.5° (c 1, tetrahydrofuran), $\lambda_{max.}$ (ethanol) 264 nm. ($\epsilon$ 21,200), $\nu_{max.}$ (Nujol) 1,780 ($\beta$-lactam), 1,674, 1,520 (—CONH—), 1,690 (—COOH), 1,720 (PhCOCO—) cm.$^{-1}$ (Found: C, 49.1; H, 3.9; N, 6.5; S, 8.0. $C_{17}H_{15}ClN_2O_6S.\frac{1}{4}H_2O$ requires: C, 49.2; H, 3.8; N, 6.7; S, 7.7 percent), N.M.R. (CDCl$_3$) 2.54, 1.70 (phenyl), 5.57, 6.63 $\tau$ (—CH$_2$OCH$_3$) R$_f$ 0.43 (system B), 0.65 (system C).

EXAMPLE 7 a. Diphenylmethyl 7$\beta$-amino-3-ethoxymethylceph-3-em-4-carboxylate hydrogen p-toluenesulphonate Diphenylmethyl 3-hydroxymethyl-7$\beta$-(2'-thienylacetamido)-ceph-3-em-4-carboxylate (10 g., 19.2 mmole.) was dissolved in dry methylene chloride (1,000 ml.) and treated with boron trifluoride etherate (0.2 ml., 1.33 mmole). A solution of diazoethane (from 100 g. nitrosylethylurea) in 60°–80° light petroleum (1,000 ml.) was added at room temperature. After 30 minutes the solution was filtered through silica and the silica was washed with ethyl acetate (3 × 50 ml.). The solvents were evaporated and the residual gum chromatographed on a silicic acid column (6.5 × 25 cms) in ethyl acetate:benzene = 1:9. Those fractions containing the major constituent in the gum (R$_f$≈0.7 in ethyl acetate:benzene = 1:5 on silica gel G) were bulked and evaporated to give a gum (4.1 g., 39 percent) which was diphenylmethyl 3-ethoxymethyl-7$\beta$-(2'-thienylacetamido)-ceph-3-em-4-carboxylate. The 7-side chain was removed by the general method described in Example 3(a). Yield of the title compound (1.42 g., 12.5 percent based on the hydroxymethyl compound), m.pt. 154°, $[\alpha]_D^{25°} = -7.1°$ (c 1, CHCl$_3$) $\lambda_{max.}$ (ethanol) 262 nm. ($\epsilon$ 7.400), $\nu_{max.}$ (Nujol) 1,782 ($\beta$-lactam), 1,220, 1,712 (—COOR), 1,175 (SO$_3^-$) cm$^{-1}$ (Found: C, 59.6; H, 5.3; N, 4.5; S, 10.0. $C_{30}H_{32}N_2O_7S_2$. $\frac{1}{2}$ H$_2$O requires: C, 59.5; H, 5.5; N, 4.6; S, 10.6 percent). N.M.R. (CDCl$_3$) 5.44 and 5.83 (quartet: J = 16 c/s, —CH$_2$OCH$_2$CH$_3$), 6.78, 8.95$\tau$(—CH$_2$—OCH$_2$CH$_3$).

b. 7$\beta$-(D-$\alpha$-Amino-$\alpha$-phenylacetamido)-3-ethoxymethylceph-3-em-4-carboxylic acid Prepared by acylation of diphenylmethyl-7$\beta$-amino-3-ethoxymethylceph-3-em-4-carboxylic acid hydrogen p-toluenesulphonate (2.0 g., 3.34 mmole.) with the mixed anhydride from N-(tert-butoxycarbonyl)-D-phenylglycine (1.21 g., 4.8 mmole.) and isobutyl chloroformate, by the general method described in Example 3(b). Yield (1.1 g., 84 percent) m.pt. 150°–155° (d) $[\alpha]_D^{22°}$ = 74.8° (c 1, H$_2$O), $\lambda_{max.}$ (water) 260 nm ($\epsilon$ 7,350), $\nu_{max.}$ (Nujol) 1,775 ($\beta$-lactam), 1,698, 1,560 (—CONH—), 1630 (COO$^-$) cm.$^{-1}$ N.M.R. (D$_2$O) 2.45 (phenyl), 5.80, 6.50, 8.85$\tau$(—CH$_2$OCH$_2$CH$_3$), R$_f$ 0.66 (system A), 0.13 (system B).

EXAMPLE 8 a. Diphenylmethyl 3-chloromethyl-7$\beta$-(2'-thienylacetamido)-ceph-3-em-4-carboxylate Diphenylmethyl 3-hydroxymethyl-7$\beta$-(2'-thienylacetamido) ceph-3-em-4-carboxylate (5.2 g., 10 mmole) and pyridine (4 ml:, 40 mmole) in dry tetrahydrofuran (75 ml.) were added dropwise at 20° to a solution of thionyl chloride (2.38 g., 1.45 ml; 20 mmole) in dry tetrahydrofuran (25 ml.) during 1 hour. After 15 minutes the mixture was poured into brine and the product extracted into ethyl acetate; the organic extract was dried and concentrated. The concentrate was added dropwise to petroleum ether (b.p. 40°–60°) and the solid product (3.9 g., 73 percent) collected. A sample was crystallized from ethanol, m.p. 125°–133° (decomp.) $[\alpha]_D^{23}$ = 6.5° (c = 1.0, tetrahydrofuran), $\lambda\lambda_{max.}$ (ethanol) 235 nm. ($\epsilon$ 13,200), 266 nm. ($\epsilon$ 8,000), $\nu_{max}$ (bromoform) 3,390 (NH), 1,785 ($\beta$-lactam), 1,725 (COOR), 1,682 and 1,510 cm$^{-1}$ (CONH); $\tau$(CDCl$_3$) 5.63, 3-methylene group singlet. (Found: C, 60.7; H, 4.7; N, 4.7; S, 11.7; Cl, 6.2 $C_{27}H_{23}N_2O_4S_2$ Cl requires: C, 60.2; H, 4.3; N, 5.2; S, 11.9; Cl, 6.6 percent), R$_f$ = 0.47 (Silica plates, benzene: ethyl acetate = 5:1).

b. Diphenylmethyl 7$\beta$-amino-3-n-propoxymethylceph-3-em-4-carboxylate hydrogen p-toluenesulphonate A solution of diphenylmethyl 3-chloromethyl-7$\beta$-(2'-thienylacetamido)-ceph-3-em-4-carboxylate (1.5 g., 2.8 mmole) in acetone (80 ml.) was treated with a solution of sodium iodide (0.45 g., 3.0 mmole.) in acetone (15 ml.). The solution was allowed to stand in the dark for 1 hour at room temperature. The solution was filtered and poured into water. The mixture was extracted with ether (3 × 15 ml.) and the ether extracts were dried over magnesium sulphate and evaporated. The gum was dissolved in n-propanol (50 ml.) and treated with a 1 percent solution of mercuric nitrate in acetonitrile (45 ml., 2.8 mmole.) at room temperature. After 10 minutes the solution was poured into water (300 ml.) and the solution extracted with benzene (3 × 50 ml.). The benzene extracts were washed with water, dried over magnesium sulphate and evaporated under reduced pressure. The resulting gum was chromatographed on a silicic acid column (4.5 × 25 cms.) in benzene: ethyl acetate = 9:1. The fractions containing the n-propoxymethyl compound (R$_f$ ca. 0.7, ethyl acetate:benzene = 1:5, on silica gel G) were bulked and evaporated (0.6 g., yield ca. 38 percent). The 7-side chain was removed by the general method described in Example 3(a). Yield of the title compound: 85 mg. (5 percent from the 3-chloromethyl compound). This material crystallized as colorless needles from chloroform-ethyl acetate, m.pt. 155°–159° (decomp.) $[\alpha]_D^{25°} = -7°$, (c 1, CHCl$_3$), $\lambda_{max.}$ (ethanol) 263 nm. ($\epsilon$7,000), $\nu_{max.}$ (Nujol) 1,788 ($\beta$-lactam), 1,710 (—COOR), 1,185 (SO$_3^-$) cm.$^{-1}$, N.M.R. (CDCl$_3$) 5.42 and 5.79 (CH$_2$OCH$_2$h$_2$CH$_3$), 6,80, 8.58, 9.18 $\tau$ (—CH$_2$OCH$_2$CH$_2$CH$_3$ ). Found: C, 60.9; H, 5.7; N, 4.2; S, 10.1. $C_{31}H_{34}N_2O_7S_2$ requires C, 61.0; H, 5.6; N, 4.6; S, 10.5 percent.

EXAMPLE 9

3-Ethoxymethyl-7$\beta$-(2'-thienylacetamido)-ceph-3-em-4-carboxylic acid

Diphenylmethyl 3-chloromethyl-7$\beta$-(2'-thienylacetamido) ceph-3-em-4-carboxylate (10.3 g.) was dissolved in ethanol (250 ml.) and kept at 60° for 4½ hours. The mixture was evaporated to give a froth (11.6 g.), which was dissolved in anisole (20 ml.) and treated with trifluoracetic acid (70 ml.) for 6 minutes. The solvent was removed at 40°/1 mm. The residual gum was triturated with ethyl acetate; the solid so obtained was discarded. The ethyl acetate solution was extracted with sodium bicarbonate solution, and the aqueous layer separated, acidified to pH 2.5 with phosphoric acid, and re-extracted with ethyl acetate. Drying and evaporation gave a gum which was taken up in the minimum amount of ethyl acetate and a fourfold volume of ether added. The precipitate was discarded and the filtrate evaporated to give a gum (2.0 g.) which was crystallized from ethyl acetate (140 ml.) to give the title compound. The mother liquor was concentrated and cooled to give a second impure crop of product ( 729 mg.). The product had the same R$_f$ values as the title compound.

EXAMPLE 10

Preparation of 3-ethoxymethyl-7$\beta$-(2'-thienylacetamido)-ceph-3-em-4-carboxylic acid The title compound was prepared via the following reaction scheme (the steps are described in more detail below).
Diphenylmethyl 3-hydroxymethyl-7$\beta$-(2'-thienylacetamido)-ceph-3-em-4-carboxylate ↓ (a)
Diphenylmethyl 3-dichloroacetoxymethyl-7$\beta$-(2-'thienylacetamido)-ceph-3-em-4-carboxylate. ↓ (b)
3-dichloroacetoxymethyl-7$\beta$-(2'-thienylacetamido)-ceph-3-em-4-carboxylic acid
3-Ethoxymethyl-7$\beta$-(2'-thienylacetamido)-ceph-3-em-4-carboxylic acid. ↓ (c)

a. Diphenylmethyl 3-dichloroacetoxymethyl-7$\beta$-(2'-thienylacetamido)ceph-3-em-4-carboxylate Diphenylmethyl 3-hydroxymethyl-7$\beta$-(2'-thienylacetamido) ceph-3-em-4-carboxylate (2.08 g., 4 mmole.) and pyridine (1.58 ml; 20 mmole) were dissolved in dry tetrahydrofuran (100 ml.) and cooled to −20°. Dichloroacetyl chloride (2.95 g; 1.96 ml; 20 mmole.) in dry tetrahydrofuran (5 ml) was added dropwise. 15 minutes after the addition the mixture was filtered, evaporated and the residue partitioned between ethyl acetate and sodium bicarbonate solution. The organic layer was washed with brine, dried and taken to small volume; this solution was then added dropwise to petrol to give a white solid (2.1 g; 85 percent), m.p. >60° (softens), $[\alpha]_D^{23} = +17.5°$ ( 1.14, dioxan), $\lambda\lambda_{max}$ (ethanol) 236 nm ($\epsilon$ = 13,300), 259 nm ($\epsilon$ = 7,600), $\nu_{max}$ (CHBr$_3$) 1,783 ($\beta$-lactam), 1,760 (CO$_2$ CHCl$_2$), 1,725 (COOR), 1,680 and 1,510 cm$^{-1}$ (CONH). N.M.R. spectrum (CDCl$_3$)—COCHCl$_2$ 4.13$\tau$. R$_f$ = 0.37 (Kieselgel G plate. Benzene:ethyl acetate = 5:1).

b. 3-Dichloroacetoxymethyl-7$\beta$-(2'-thienylacetamido)ceph-3-em-4-carboxylic acid Diphenylmethyl 3-dichloroacetoxymethyl-7$\beta$-(2'-thienylacetamido)-ceph-3-em-4-carboxylate (6.8 g) was dissolved in anisole (5 ml), and trifluoroacetic acid (15 ml) added. After 4 minutes the solvent was removed at 30°. The residue was dissolved in ethyl acetate and re-evaporated; the gum was redissolved in ethyl acetate (10 ml) and added dropwise, with stirring, to petroleum ether (400 ml). The product was obtained as a yellow solid, m.p. > 60° (softens; decomp. at 99°) (4.92 g; 95 percent, $[\alpha]_D^{27} = +56°$ (c, 0.7; dioxan), $\lambda\lambda_{max}$ (ethanol) 237 nm ($\epsilon$ = 12,500), 259 nm ($\epsilon$ = 7,500), $\nu_{max}$ (CHBr$_3$) 3,390 (NH), 1,788 ($\beta$-lactam), 1,760 (COOR), 1,685 and 1,518 (CONH), 1,735 and 1,715 cm$^{-1}$ (COOH). N.M.R. spectrum (CDCl$_3$)—CH$_2$OCHCl$_2$ 4.0 $\tau$.

The dicyclohexylamine salt crystallized from acetone, m.p. > 100° (softens; decomp. at 210°), $[\alpha]_D^{25}$ = +36° (c 1.0, chloroform), $\lambda\lambda_{max}$ (ethanol) 235 nm ($\epsilon$ = 13,600), 265 nm ($\epsilon$ = 6,950), $\nu_{max}$ (CHBr$_3$) 1,774 ($\beta$-lactam), 1,765 (COOR), 1,635 (COO$^-$), 1,680 and 1,518 (CONH), 812 cm$^{-1}$ (CHCl$_2$). N.M.R. spectrum (CDCl$_3$) — CH$_2$·O·COCHCl$_2$ 3.91$\tau$. (Found: C, 52.0; H, 5.7; N, 6.3; Cl 14.2. C$_{16}$H$_{14}$Cl$_2$N$_2$O$_6$S$_2$. (C$_6$H$_{11}$)$_2$NH requires C, 52.0; H, 5.8; N, 6.5; Cl 14.8 percent).

c. 3-Ethoxymethyl-7$\beta$-(2'-thienylacetamido) ceph-3-em-4-carboxylic acid.

3-Dichloroacetoxymethyl-7$\beta$-(2'-thienylacetamido) ceph-3-em-4-carboxylic acid (4.74 g.) was refluxed in ethanol (175 ml.) for 60 minutes; the mixture was filtered and the filtrate evaporated to give an oil. Trituration with ethyl acetate gave a solid (354 mg.), which was discarded. The ethyl acetate solution was extracted with sodium bicarbonate solution; the aqueous layer was then acidified and extracted with ethyl acetate. On drying and evaporation this solution gave a gum (3.34 g.), which was redissolved in hot ethyl acetate. Addition of a fourfold volume of ether gave a solid, which was discarded. The filtrate was concentrated and set aside at 0°; a white solid (548 mg.) crystallized out, m.p. 160°-165° (decomp.), $[\alpha]_D^{25}$ = 157° (c 0.7, tetrahydrofuran) $\lambda\lambda_{max}$ (NaHCO$_3$ solution) 237 nm ($\epsilon$ = 12,800), 260 nm ($\epsilon$ 8,000), $\nu_{max}$ (CHBr$_3$) 1,770 ($\beta$-lactam), 1,720 (COOH), 1,659 and 1,678 cm$^{-1}$ (CONH). N.M.R. spectrum (D$_2$O, with sodium bicarbonate) OCH$_2$CH$_3$ systems centered at 6.5 and 8.83 $\tau$. (Found: C, 50.6; H, 4.8; N, 7.1; S, 16.3. C$_{16}$H$_{18}$N$_2$O$_5$S$_2$ requires C, 50.2; H, 4.7; N, 7.4; S, 16.8 percent). R$_T$ = 1.5 (System C), 1.35 (System B).

EXAMPLE 11

3-n-Propoxymethyl-7$\beta$-(2'-thienylacetamido)-ceph-3-em-4-carboxylic acid

3-Dichloroacetoxymethyl-7$\beta$-(2'-thienylacetamido)-ceph-3-em-4-carboxylic acid (5 g., 12.9 mmoles.) was refluxed in n-propanol (50 ml.) for 20 minutes. The solution was cooled and the precipitated brown solid filtered and discarded. The filtrate was treated with water (300 ml.) and the pH adjusted to 8.5 with aqueous sodium bicarbonate. The solution was extracted with ethyl acetate (2 × 20 ml.) and the extracts discarded. The aqueous phase was acidified to pH 1.5 and extracted with ethyl acetate (3 × 20 ml.). After drying, the solvent was removed and the residue dissolved in ethyl acetate (50 ml.), and ether (100 ml.) added. The precipitated brown solid was filtered off and discarded, and the filtrate evaporated to dryness. The residue was twice crystallized from aqueous ethanol to give the title compound as colorless needles (500 mg., 11.7 percent), m.p. 152°-154° (d), $[\alpha]_D^{25°}$ = 79.8° (c 1.0, tetrahydrofuran), $\lambda_{max}$. (pH6-phosphate buffer) 236 nm. ($\epsilon$13,600), 260 nm. ($\epsilon$8,700) (shoulder), $\nu_{max}$. (Nujol) 3,310 (—NH—), 1,772 ($\beta$-lactam), 1,724 (—COOH), 1,665 and 1,535 (—CONH—) cm$^{-1}$. (Found: C, 51.3; H, 5.1; N, 6.9; S, 15.9. C$_{17}$H$_{20}$N$_2$S$_2$O$_5$ requires: C, 51.5; H, 5.1; N, 7.1; S, 16.2 percent). N.M.R. (D$_2$O-NaHCO$_3$) 5.78, 6.60, 8.52, 9.13 $\tau$ (—CH$_2$OCH$_2$CH$_2$CH$_3$), R$_f$ 0.48 (System B); 0.54 (System C).

EXAMPLE 12

The reaction between 3-dichloroacetoxymethyl-7$\beta$-(2'-thienylacetamido)ceph-3-em-4-carboxylic acid and various alcohols.

A solution of the title compound (0.25 g.) in the appropriate alcohol (10 ml.) was refluxed for 20 minutes. 10 $\mu$l samples were taken and chromatographed in Systems B and C. The papers were viewed, under ultraviolet light (254 nm.). The R$_f$ values of the 3-alkoxymethyl compounds produced are given below

| Alcohol | R$_f$ System B | R$_f$ System C |
|---|---|---|
| CH$_3$OH | 0.26 | 0.29 |
| CH$_3$CH$_2$CH$_2$CH$_2$OH | 0.46 | 0.50 |

EXAMPLE 13

3-Isopropoxymethyl-7$\beta$-(2'-thienylacetamido)ceph-3-em-4-carboxylic acid

3-Dichloroacetoxymethyl-7$\beta$-(2'-thienylacetamido)ceph-3-em-4-carboxylic acid (12.0 g., 25.8 mmole.) was refluxed in isopropanol (100 ml.) for 45 minutes. After filtration through a pad of Kieselguhr, the isopropanol solution was poured into water (1,000 ml.) and the pH adjusted to 8.5. The solution was extracted with ethyl acetate (2 × 100 ml.) and the extracts discarded. The solution was then acidified to pH 1.5 with 2N-hydrochloric acid and extracted with ethyl acetate (3 × 100 ml.). The ethyl acetate extracts were dried over magnesium sulphate and evaporated. The residue (8.5 g.) was dissolved in a minimum of hot ethanol, from which the title compound separated on cooling (1.5 g., 15 percent). This material recrystallized from ethanol as colorless prisms, m.p. 169°-171 ° (d), $[\alpha]_D^{28}$ + 87° (c 1.0, tetrahydrofuran). $\lambda\lambda_{max}$. (ethanol) 237 nm ($\epsilon$ 14,500), 260 nm ($\epsilon$ 7,900, $\nu_{max}$. (Nujol) 1,775 ($\beta$-lactam), 1,728 (COOH), 1,668 and 1,535 cm.$^{-1}$ (CONH), N.M.R. (D$_2$O, with sodium bicarbonate) 5.64 and 5.95 (quartet: J = 16 Hz —CH$_2$OCH(CH$_3$)$_2$), 6.31, 8.87$\tau$ (—CH$_2$—OCH (CH$_3$)$_2$ respectively). (Found: C, 51.6; H, 5.1; N, 6.7; S, 16.3. C$_{17}$H$_{20}$N$_2$O$_5$S$_2$ requires C, 51.5; H, 5.1; N, 6.1; S, 16.2 percent. R$_f$ 0.32 (system B), 0.65 (system C).

EXAMPLE 14

The Reaction of 3-dichloroacetoxymethyl-7$\beta$-(2'-thienylacetamido)-ceph-3-em-4-carboxylic acid with various alcohols.

Solutions of the acid (40 mg.) in each alcohol (0.5 ml.) were heated at 80° for half an hour. Samples (5 $\mu$l.) were spotted onto papers which were developed with solvent System C to about 30 cms. The papers were submitted for bioautograph against Staph. aureus C864 and E. coli 573. The biological activities $$\left(\text{estimated as } \frac{\text{the area of biologically active zone}}{\text{the area of UV-absorbent zone}}\right)$$

of the new spots (other than material remaining on the base line or travelling at the solvent front) are summarized in the table following Example 15.

EXAMPLE 15

The Reaction between 3-dichloroacetoxymethyl-7β-(2'-thienylacetamido)-ceph-3-em-4-carboxylic acid and phenol A mixture of the acid (0.5 g., 1.08 mmole.) and phenol (0.8 g., 5.3 mmole.) was heated at 80° for 8 minutes. The melt was cooled and dissolved in ethyl acetate (10 ml.). The insoluble material was filtered off and discarded, and the filtrate washed with water (2 × 10 ml.). Samples (5 μl) were spotted onto papers which were developed with solvent System C to about 30 cms. The papers were submitted for bioautograph against Staph. aureus C 864 and E. coli 573. The results were estimated in the same manner as in Example 14 and are presented in the following table.

| Alcohol | $R_f$ | Staph.aureus | E.coli |
| --- | --- | --- | --- |
| a. Cyclohexanol | 0.57 | +++ | + |
| b. Benzylalcohol | 0.47 | +++ | + |
| c. Phenyl ethynyl alcohol | 0.56 | | |
| d. Furfuryl alcohol, spot 1 | 0.25 | +++ | trace |
| Furfuryl alcohol, spot 2 | 0.53 | +++ | trace |
| e. 2-Chloroethanol | 0.41 | +++ | trace |
| f. Phenol | 0.70 | +++ | + |

EXAMPLE 16

7β-(D-α-Acetoxy-α-phenylacetamido)-3-methoxymethyl-ceph-3-em-4-carboxylic acid

Prepared by acylation of diphenylmethyl 7β-amino-3-methoxymethylceph-3-em-4-carboxylate hydrogen p-toluenesulphonate (2.4 g., 4 mmole.) by the general procedure already described in Example 3(b) with D(-)-α-acetoxy-α-phenylacetyl chloride (0.94 g., 4.4 mmole.); yield 1.57 g. (93 percent). The product was recrystallized from ethanol-petroleum ether (1:1; 20 ml.) to give colorless needles, m.p. 108°–110° (decomp) $[\alpha]_D^{25} + 11°$ (c 0.9, dioxan), $\lambda_{max.}$ (pH6-phosphate buffer) 259 nm. (ε 7,750), $\nu_{max.}$ (Nujol) 3,500 (H$_2$O), 3,272 (—NH—), 1,778 (β-lactam), 1,738 and 1,240 (—OCOCH$_3$), 1,676 and 1,552 (—CONH—), 1,102 cm.$^{-1}$ (—C—O—C—); N.M.R. (D$_2$O with NaHCO$_3$) 3.93 (PhCH(OAc)CONH—), 5.82, 6.70 (—CH$_2$OCH$_3$), 6.30, 8.78 τ (0.4 mole of ethanol). (Found: C, 51.1; H, 5.0; N, 6.05; S, 6.5 percent. C$_{19}$H$_{20}$N$_2$O$_7$S. 0.4 C$_2$H$_5$OH, 1.5 H$_2$O requires C, 51.2; H, 5.5; N, 6.0; S, 6.9 percent), $R_f$ 0.12 (System C).

EXAMPLE 17

3-Methoxymethyl-7β-methylthioacetamidoceph-3-em-4-carboxylic acid

Prepared by acylation of diphenylmethyl 7β-amino-3-methoxymethylceph-3-em-4-carboxylate hydrogen p-toluenesulphonate (2.40 g., 4 mmole.) by the general procedure already described in Example 3(b) with methylthioacetyl chloride (0.55 g., 4.4 mmole.); yield 1.16 g., (87 percent). The product was recrystallized from acetone-petroleum ether to give colorless needles, m.p. 147°–152° $[\alpha]_D^{25} + 98.5°$ (c 1; dioxan), $\lambda_{max.}$ (pH6-phosphate buffer) 258 nm. (ε 8,100), $\nu_{max.}$ (Nujol) 1,780–1,770 (β-lactam), 1,733 (—CO$_2$H), 1,630 and 1,555 cm.$^{-1}$ (—CONH—), N.M.R. (D$_2$O with NaHCO$_3$) 6.67, 7.81 (—COCH$_2$SCH$_3$), 5.78, 6.70τ (CH$_2$OCH$_3$, 0.02 (System C).

EXAMPLE 18

Sodium 7β-(D-α-formyloxy-α-phenylacetamido)-3-methoxymethylceph-3-em-4-carboxylate a. (D-)-α-Formyloxy-α-phenylacetic acid A mixture of D(-)-mandelic acid (5.0 g., 33 mmole.), $[\alpha]_D$ − 145° (c 1; water), p-toluenesulphonic acid (0.72 g., 3.8 mmole.), benzene (125 ml.) and 98 percent formic acid (25 ml.) was heated under reflux for 6 hrs. using a Dean and Stark apparatus, when most of the formic acid had been removed by slow distillation. The cooled reaction mixture was washed with brine (2 × 100 ml.), dried and evaporated to a viscous liquid (5.2 g.) which was crystallized from benzene-petroleum ether (b.p. 60°–80°) to give the product as prisms (3.47 g., 58 percent), m.p. 58°–60°, $[\alpha]_D$ - 168° ( c 1; ethanol), $\nu_{max.}$ (CHBr$_3$) 3,470, 1,760, 1,720 (—CO$_2$H), 1,730 cm.$^{-1}$ (—OCHO) N.M.R. (CDCl$_3$) 1.81 (—OCHO), 3.90τ (PhCH(OCHO)CO$_2$H).

b. D(-)-α-formyloxy-α-phenylacetyl chloride

A solution of D(-)-α-formyloxy-α-phenylacetic acid (9 g., 50 mmole.), thionyl chloride (9 ml., 2.5 equiv.) and dry benzene (30 ml.) was heated under reflux for 1 hr. The benzene and the excess of thionyl chloride were removed in vacuo; more dry benzene (20 ml.) was added and similarly removed to give the acid chloride as a yellow oil (9.8 g., 99 percent), $[\alpha]_D$ −227.5° (c 1.1; toluene), $\nu_{max.}$ (CHBr$_3$) 1,800 cm.$^{-1}$ (—COCl).

c. Sodium 7β-(D-α-formyloxy-α-phenylacetamido)-3-methoxymethylceph-3-em-4-carboxylate Prepared by acylation of diphenylmethyl 7β-amino-3-methoxymethylceph-3-em-4-carboxylate hydrogen p-toluenesulphonate (2.66 g., 4.4 mmole.) by the general procedure already described in Example 3(b) with D(-)-α-formyloxy-α-phenylacetyl chloride (1.1 g., 6.1 mmole.); yield of crude acid (1.27 g., 71 percent). The product in acetone was treated with a 10 percent solution of sodium 2-ethylhexanoate in acetone 4.5 ml.) to give the sodium salt, $[\alpha]_D^{27} + 61°$ (c 1; dimethylsulphoxide), $\lambda_{max.}$ (water) 258 nm. ($E_{1cm}^{1\%}$ 146), $\nu_{max.}$ (Nujol) 3,400 (H$_2$O), 1,760 (β-lactam), 1,722 (—OCHO), 1,682, 1,550 cm$^{-1}$ (—CONH—), N.M.R. (D$_2$O) 1.62 (—OCHO), 3.76 (PhCH(OCHO)CONH—), 5.80, 6.72 τ (—CH$_2$OCH$_3$), $R_{PAC}$ 0.96 (System C) with some decomposition to 7β -(D-α-hydroxy-α-phenylacetamido)-3-methoxymethyl-ceph-3-em-4-carboxylic acid, $R_{PAC}$ 0.29.

EXAMPLE 19

Etherification with methyl orthoformate

A suspension of diphenylmethyl 3-hydroxymethyl-7β-(2'-thienylacetamido)ceph-3-em-4-carboxylate (520 mg., 1 mmole) in methyl orthoformate (5 ml.) at −20° was treated with perchloric acid (relative density 1.54; 0.12 ml., 1.1 mmole.), and kept at this temperature for 20 minutes. Filtration yielded a solid (200 mg.), which was starting material. The filtrate was poured immediately into 2N-sodium bicarbonate. Extraction with ethyl acetate yielded a gum, purified by chromatography on a thin layer of Kieselgel G, with benzene:ethyl acetate = 5:1 as solvent. Elution of one of the fractions with ethyl acetate and precipitation with light petroleum gave a solid (20 mg.) identified by chromatography and infrared spectroscopy with authentic diphenylmethyl 3-methoxymethyl-7β-(2'-thienylacetamido)ceph-3-em-4-carboxylate.

EXAMPLE 20.

7β-Cyanoacetamido-3-methoxymethylceph-3-em-4-carboxylic acid

Acylation of diphenylmethyl 7β-amino-3-methoxymethyl-ceph-3-em-4-carboxylate, hydrogen toluene p-sulphonate (2 g., 3.43 mmole) with cyanoacetyl chloride [prepared from cyanoacetic acid (0.7 g., 8.2 mmole.) and oxalyl chloride], by the general procedure already described in Example 3(b), yielded the title compound (0.96 g., 90 percent). The product crystallized as colorless needles from ethanol m.p. 190°–192° (decomp.), $[\alpha]_D^{23} + 113°$ (c 1, tetrahydrofuran), $\lambda_{max.}$ (ethanol) 260–263 nm (ε 7,100), $\nu_{max.}$ (Nujol) 2,264 (CN), 1,772 (β-lactam), 1,720 (—COOH), and 1,660 and 1,538 cm.$^{-1}$ (CONH), N.M.R. (D$_2$O, with NaHCO$_3$) 5.78 (—CH$_2$OCH$_3$), 6.70 (—O—CH$_3$) and 4.32 and 4.80 (protons at the 6- and 7-positions). (Found: C, 46.1; H, 4.2; N, 13.4; S, 10.0. C$_{12}$H$_{13}$N$_3$O$_5$S requires C, 46.3; H, 4.2; N, 13.5; S, 10.3 percent), $R_f$ 0.10 (system C).

EXAMPLE 21

3-Methoxymethyl-7β-trichloroacetamidoceph-3-em-4-carboxylic acid.

Acylation of diphenylmethyl 7β-amino-3-methoxymethylceph-3-em-4-carboxylate, hydrogen toluene p-sulphonate (1.5 g., 2.66 m.mole.), by the general procedure already described in Example 3(b), with trichloroacetyl chloride (0.33 ml., 2.92 m.mole.) yielded the title compound (0.95 g., 95 percent). The product was a foam; some of it was converted in ethyl acetate: ether = 1.1 into the crystalline dicyclohexylamine salt, m.p. 195°–200° (decomp.), $[\alpha]_D^{23}$ + 71° (c 1, tetrahydrofuran), $\lambda_{max.}$ (ethanol) 262 nm ($\epsilon$ 6,200), $\nu_{max.}$ (bromoform) 3,425 (NH), 1,774 (β-lactam), 1,722 and 1,518 (CONH)., and 1,632 cm.$^{-1}$ (COO$^-$), N.M.R. (CDCl$_3$) 5.58 (CH$_2$OCH$_3$6.65 τ (CH$_2$OCH$_3$). (Found: C, 48.8, H, 5.7; N, 7.2; S, 6.6; Cl, 18.0. C$_{23}$H$_{34}$Cl$_3$N$_3$O$_5$S requires C, 48.4; H, 6.0, N, 7.4; S, 5.6; Cl, 18.6 percent), R$_f$ 0.43 (system C).

EXAMPLE 22

3-Methoxymethyl-7β-(2', 2', 2' -trichloroethoxycarbonylamino)-ceph-3-em-4-carboxylic acid Acylation of diphenylmethyl 7β-amino-3-methoxymethylceph-3-em-4-carboxylate hydrogen toluene p-sulphonate (1.5 g., 2.66 mmole.), by the general procedure already described in Example 3 (b), with trichloroethyl chloroformate (0.35 ml., 2.92 m.mole.) gave the title compound (1.0 g., 96 percent). The product was a foam; some was converted in ethyl acetate: ether = 1:1 to the crystalline dicyclohexylamine salt, m.p. 171°–174° (decomp.), $[\alpha]_D^{23}$ + 69° (c 1, tetrahydrofuran), $\lambda_{max.}$ (ethanol) 263 nm ($\epsilon$ 7,400), $\nu_{max.}$ (bromoform) 1,776 (β-lactam), 1,522 and 1,746 (NHCO$_2$·CH$_2$CCl$_3$), 1,590 and 1,636 (COO$^-$), and 3,445 cm.$^{-1}$ (NH), N.M.R. (CDCl$_3$) 5.17 (CCl$_3$CH$_2$5.57 (CH$_2$—OCH$_3$), and 6.64 τ(CH$_2$OCH$_3$). (Found: C, 48.2; H, 5.8; N, 6.9; S, 5.3; Cl, 17.0. C$_{24}$H$_{36}$Cl$_3$N$_3$O$_6$48.0; H, 6.0; N.6.9; S, 5.3; Cl, 17.7 percent), R$_f$ 0.51 (system C).

EXAMPLE 23

7β-S-Benzylthioacetamido-3-methoxymethyl-ceph-3-em-4-carboxylic acid

Acylation of diphenylmethyl 7β-amino-3-methoxymethyl-ceph-3-em-4-carboxylate, hydrogen toluene p-sulphonate (2 g., 3.43 m.mole.) by the general procedure already described in Example 3 (b), with S-benzylthioacetyl chloride (0.78 g., 3.8 m.mole.) gave the title compound (1.13 g., 80.5 percent), m.p. 101°–106°, $[\alpha]_D^{23}$ + 128° (c 1.0, ethanol)., $\lambda_{max.}$ (ethanol) 255–258 nm ($\epsilon$ 7,300), $\nu_{max.}$ (CHBr$_3$) 1,790 (β-lactam), 1,742 (COOH), and 1,684 and 1,518 cm.$^{-1}$ (CONH), N.M.R. (CDCl$_3$), 5.59 (—CH$_2$—O—CH$_3$), 6.21 (PhCH$_2$—S—), and 6.64 τ (—O—CH$_3$).

EXAMPLE 24

7β-Bromoacetamido-3-methoxymethylceph-3-em-4-carboxylic acid

Acylation of diphenylmethyl 7β-amino-3-methoxymethyl-ceph-3-em-4-carboxylate, hydrogen toluene-p-sulphonate (2 g., 3.43 m.mole.), by the general procedure already described in Example 3(b), with bromoacetyl bromide (1.39 g., 0.605 ml., 6.87 m.mole.) gave a product that crystallized from ethyl acetate during work-up (0.791 g., 63.5 percent); a second crop was obtained from the filtrate on concentration (0.092 g., 7.3 percent), m.p. 154° (decomp.), $[\alpha]_D$ + 95° (dioxan, c 1.01 $\lambda_{max.}$ (pH 6.0 phosphate) 258 nm ($\epsilon$ 9,050), $\nu_{max.}$ (Nujol) 1,775 (β-lactam), 1,725 (—CO$_2$H) and 1,655 and 1,550 (CONH), N.M.R. (D$_2$O, with NaHCO$_3$) 5.82 (—CH$_2$—O—CH$_3$), 6.01 (Br—CH$_2$—CO—NH), 6.71 (—O—CH$_3$), and 8.82 and 6.35τ(0.5 mole. ethanol) (Found: C, 37.5; H, 4.2; Br, 19.9; N, 6.6; S, 8.1. C$_{11}$H$_{13}$BrN$_2$O$_5$·0.5 C$_2$H$_5$OH requires C, 37.1; H, 4.15; Br, 20.6; N, 7.2; S, 8.3), R$_f$ 0.26 (System B).

EXAMPLE 25

7β-(p-Fluorophenoxyacetamido)-3-methoxymethylceph-3-em-4-carboxylic acid.

Diphenylmethyl 7β-amino-3-methoxymethylceph-3-em-4-carboxylate, hydrogen p-toluene sulphonate (3.43 g., 0.0059 mmole.) was dissolved in acetonitrile (25 ml.) and N,N-dimethylacetamide (6 ml.), and p-fluorophenylacetyl chloride (1.23 g., 0.0065 mol.) was added over 2 min. The solution was kept at room temperature for 15 min., then the solvents were evaporated. The residue was dissolved in ethyl acetate (30 ml.), the solution washed with 30 percent-sodium hydrogen carbonate (3 × 30 ml.), water (30 ml.), and brine (30 ml.), dried (magnesium sulphate) and the solvent evaporated. The residue was dissolved in anisole (3 ml.) and trifluoroacetic acid (12 ml.). After 5 min. the volatile reagents were evaporated in vacuo, the residue dissolved in ethyl acetate and petroleum-ether (b.p. 40°–60°) was added, precipitating a colorless solid which was collected by filtration, giving the crude product as a powder (1.26 g.). This was crystallized from acetone-water giving 7β-(p-fluorophenoxyacetamido)-3-methoxymethylceph-3-em-4-carboxylic acid as colorless prisms (0.86 g.), m.p. 146°–148°, $[\alpha]_D^{25}$+ 65.9° (c 1.00, dioxan), $\lambda_{max.}$ (pH 6 buffer) 262 nm ($\epsilon$ 9,740), $\nu_{max.}$ (bromoform) 1,780 (β-lactam), 1,736 (carboxylic acid), and 1,692 and 1,520 cm$^{-1}$ (CONH) (Found: C, 52.0; H, 4.3; N, 7.2; S, 8.4; F, 4.6. C$_{17}$H$_{17}$N$_2$O$_6$FS (396) requires C, 51.5; H, 4.3; N, 7.1; S, 8.1; F, 4.8 percent).

EXAMPLE 26

7β-(2' ,5'-Dichlorophenylacetamido)-3-methoxymethylceph-3-em--4-carboxylic acid.

A solution of diphenylmethyl 7β-amino-3-methoxymethyl ceph-3-em-4-carboxylate, hydrogen p-toluene sulphonate (2.22 gm., 3.8 mmole.) in N,N-dimethylacetamide (4 ml.) and acetonitrile (16 ml.) was treated with 2,5-dichlorophenylacetyl chloride (850 mg., 3.8 mmole.). The mixture was stirred at room temperature for 15 mins. and the solvent removed, to give a residual oil which was dissolved in ethyl acetate (50 ml.) and washed with 10 percent-sodium hydrogen carbonate solution (2 × 30 ml.) and brine (100 ml.), and dried (MgSO$_4$). Removal of the solvent gave a yellow foam which was dissolved in a mixture of anisole (2 ml.) and trifluoroacetic acid (8 ml.) and the mixture stirred at room temperature for 5 mins. The volatile material was removed to afford a gum which gave a white powder on treatment with petroleum ether (1.8 gm., 79 percent) m.p. 114°–125° (dec.), R$_p$ (solvent A), R$_p$ 2.44 (solvent C), $[\alpha]_D^{21}$ + 123° (Me$_2$SO, C 1.00), $\lambda_{max.}$ (ethanol) 262 nm ($\epsilon$ 6,800) and 225 nm ($\epsilon$ 14,300), $\nu_{max.}$ (Nujol) 3,200 cm.$^{-1}$ (NH), 1,778 cm.$^{-1}$ (β-lactam) 1,710 cm.$^{-1}$ (CO$_2$H), and 1,660 and 1,550 cm.$^{-1}$ (CONH), τ(in [D$_3$C]$_2$SO) 2.4–2.7 (3-aromatic protons), 4.28 (1-proton double doublet, J 8.5 and 5 Hz, *7–H), 4.86 (1-proton doublet, J 5 Hz, 6H), 5.77, (3-proton singlet, 3-CH$_2$), 6.24 (2-proton singlet, benzylic methylene), 6.43 (2-proton singlet, 2-CH$_2$), 6.76 (3-proton singlet, OCH$_3$) (Found: C, 46.9; H, 3.7; N, 6.4; S, 7.6; Cl, 15.5. C$_{17}$H$_{16}$N$_2$SO$_5$Cl$_2$ requires C, 47.3; H, 3.7; N, 6.4; S, 7.4; Cl, 16.4%).

EXAMPLE 27

7β-(4-Aminophenylacetamido)-3-methoxymethylceph-3-em-4-carboxylic acid.

Diphenylmethyl 7β-amino-3-methoxymethylceph-3-em-4-carboxylate, hydrogen p-toluene sulphonate (1.37 gm., 2.4 mmole.) was added portionwise to a stirred mixture of sodium hydrogen carbonate (0.201 gm., 2.4 mmole.), water 5ml.), and methylene dichloride (5 ml.). The organic phase was separated and the aqueous solution extracted with methylene dichloride (3 × 5 ml.). The combined organic extracts were washed with brine and dried (MgSO$_4$). The methylene chloride solution was treated with dicyclohexylcarbodiimide (0.494 gm, 2.4 m.mole.) and then portionwise with a solution of p-N-tri-phenylmethylaminophenylacetic acid (0.943 gm., 2.4 m.mole.) in N,N-dimethylformamide (2 ml.). The reaction mixture was stirred at room temperature for 3 hours and the precipitated dicyclohexyl urea removed. The filtrate was stored at 0° overnight, and the volatile material removed. The residue was dissolved in ethyl acetate, filtered, and the filtrate washed with 3 percent-sodium hydrogen carbonate solution (3 × 10 ml.), and brine, and dried (MgSO$_4$) and evaporated to give diphenylmethyl 7$\beta$-(4'-N-triphenylmethylaminophenylacetamido)-3-methoxymethylceph- 3-em-4-carboxylate as an off-white powder (1.2 gm., 65 percent), $[\alpha]_D^{20}$ + 5° (C 1.00, dioxan) m.p. 90°–105° (dec.), $\lambda_{max.}$ (ethanol) 252 nm ($\epsilon$ 18,200), $\nu_{max.}$ (CHBr$_3$) 3,390 cm.$^{-1}$ (NH), 1,782 cm.$^{-1}$ ($\beta$-lactam), 1,722 cm.$^{-1}$ (ester), 1,685 and 1,512 cm.$^{-1}$ (CONH), 802 cm.$^{-1}$ (phenyl, p-disubstituted), and 748 cm.$^{-1}$ (monosubstituted phenyl), $\tau$(CDCl$_3$) 2.5–2.9 (25 protons, aromatic), 3.19 and 3.67 [two 2-proton doublets (branches of a quartet), J 8 Hz, aromatic], 3.04 (1-proton singlet, methine), 5.73 (3-proton singlet, 3-CH$_2$), 6.53 and 6.60 (two 2-proton singlets, 2-CH$_2$ and benzylic —CH$_2$).

Diphenylmethyl 7$\beta$-(4'-N-triphenylmethyl-aminophenylacetamido)-3-methoxymethylceph-3-em-4-carboxylate (1.05 gm.) was added portionwise to a mixture of trifluoroacetic acid (5 ml.) and anisole (0.5 ml.) at 0°, and the mixture stirred at room temperature for 10 mins. The volatile material was removed, and the residue slurried with ether to give the title compound as a white powder (500 mg., 88 percent) m.p. 180° (dec.), R$_p$ 0.79 (solvent A), R$_p$ 0.15 (solvent C), R$_f$ 0.3 (electrophoresis, pH 1.9, 500v, 75 mins.). $[\alpha]_D$ + 66° (C 1.00, N,N-dimethylformamide), $\lambda_{max.}$ (pH 6 buffer) 239.5 nm ($\epsilon$ 12,000), $\nu_{max.}$ (Nujol) 3,260 cm.$^{-1}$ (NH), 1765 cm.$^{-1}$ ($\beta$-lactam), 1,642 and 1,510 cm$^{-1}$ (CONH), 1,534 cm.$^{-1}$ (CO$_2$—), $\tau$ (D$_2$O) with NaHCO$_3$) 2.81 and 3.16 [two 2-proton doublets (branches of a quartet), J 8Hz, aromatic protons], 4.38 (1-proton doublet, J 4.5 Hz, 7-H), 4.92 (1-proton doublet, J 4.5 Hz, 6-H), 5.78 (2-proton singlet, 3-CH$_2$), 6.36 and 6.73 [two 1-proton doublets (branches of a quartet), J 18 Hz, 2-CH$_2$], 6.44 (2-proton singlet, benzylic CH$_2$), 6.70 (3-proton singlet, OCH$_3$).

EXAMPLE 28

7$\beta$-[4'-N-Formylaminophenylacetamido]-3-methoxymethylceph-3-em-4-carboxylic acid Diphenylmethyl 7$\beta$-amino-3-methoxymethylceph-3-em-4-carboxylate p-toluenesulphonate (4.37 gm, 7.5 mmole.) was added portionwise with stirring to a solution of sodium hydrogen carbonate (0.63 gm., 7.5 mmole.) in water (15 ml.) and methylene dichloride (15 ml.). The organic phase was separated and the aqueous solution extracted with methylene dichloride (15 ml.). The combined organic extracts were washed with brine and dried. To this methylene chloride solution was added dicyclohexylcarbodiimide (1.56 gm., 7.5 mmole.), followed by a portionwise addition of p-N-formylaminophenylacetic acid (1.34 gm., 7.5 mmole.) in N,N-dimethylformamide (6 ml.). The reaction mixture was stirred at room temperature for 3 hours, filtered, and stored at 0° for 12 hours, and the solvent removed. The residue was dissolved in ethyl acetate, filtered, and the filtrate washed with dilute hydrochloric acid, dilute sodium hydrogen carbonate, water and brine, then dried and evaporated to give diphenylmethyl 7$\beta$-(4'-N-formylaminophenylacetamido)-3-methoxymethylceph-3-em-4-carboxylate as a white powder (2.9 gm., 67 percent), m.p. 160°–168° (dec.), $\lambda_{max.}$ (ethanol) 251 nm ($\epsilon$21,000), $\nu_{max.}$ (Nujol) 1,780 cm.$^{-1}$ ($\beta$-lactam), 1,730 cm.$^{-1}$ (ester), 1,682 and 1,530 cm$^{-1}$ (CONH), 1,668 and 1,548 cm.$^{-1}$ (CONH), and 702 cm.$^{-1}$ (phenyl), $\tau$(in CD$_3$)$_2$SO) -0.15 (1-proton singlet, 4'-NH), 0.87 (1-proton singlet, J 8.5 Hz, 7-NH), 1.72 (1-proton doublet, J 1.5 Hz, CHO), 2.60 (14-protons, complex, aromatic), 3.02 (1-proton singlet, methine), 4.22 (1-proton doublet, J 8.5 and 4.5 Hz, (7-H)), 4.83 (1-proton, doublet, J 8Hz, 6-H), 5.92 (2-protons, singlet, 3-CH$_2$), 6.42 and 6.48 (two 2-proton singlets, 2-CH$_2$ and benzylic-CH$_2$), 6.91 (3-proton singlet, OCH$_3$).

Diphenylmethyl 7$\beta$-[4'-N-formylamino-phenylacetamido]-3-methoxymethylceph-3-em-4-carboxylate (500 mg.) was added to a mixture of trifluoroacetic acid (2.5 ml.) and anisole (0.2 ml.) at 0°. The mixture was stirred at room temperature for 10 mins., the volatile material was removed and the residual gum slurried with ether to afford the title compound as a white powder (200 mg., 60 percent). R$_p$ 0.73 (solvent A), R$_p$ 0.29 (solvent C), $[\alpha]_D^{19}$ + 120° (saturated NaHCO$_3$, C 1.00). $\lambda_{max.}$ (pH 6 buffer) 246 nm ($\epsilon$23,000), $\nu_{max.}$ (Nujol) 3,306 and 3,246 cm.$^{-1}$ (NH), 2,600 and 1,706 cm.$^{-1}$ (CO$_2$H), 1,776 cm.$^{-1}$ ($\beta$-lactam), 1,646 and 1,532 cm.$^{-1}$ (CONH), and 802 cm.$^{-1}$ (phenyl), $\tau$ (in (CD$_3$)$_2$SO)-0.20 (1-proton singlet, 4'-NH), 1.62 (1 proton, broad singlet, CHO), 0.83 (1-proton doublet J 8Hz, 7-NH), 4.30 and 4.84 (2-protons, 6- and 7-H) 5.75 (2-proton singlet, 3-CH$_2$), 6.42 (4-protons, broad singlet, 2-CH$_2$ and benzylic CH$_2$), 6.72 (3-proton singlet, OCH$_3$) (Found: C, 53.5; H, 4.9; N, 10.2; S, 7.9. C$_{18}$H$_{19}$N$_3$SO$_6$ requires C, 53.3; H, 4.7; N, 10.3; S, 7.9 percent).

EXAMPLE 29 a. Diphenylmethyl 7$\beta$-amino-3-isopropoxymethylceph-3-em-4-carboxylate, hydrogen p-toluenesulphonate.

3-Dichloroacetoxymethyl-7$\beta$-(2'-thienylacetamido)-ceph-3-em-4-carboxylic acid (14 g., 30.1 mmole.) was refluxed in isopropanol (110 ml.) for 45 minutes. After filtration through a pad of kieselguhr, the isopropanol solution was poured into water (1,000 ml.) and the pH adjusted to 8.5. The solution was extracted with ethyl acetate (2 × 100 ml.) and the extracts discarded. The solution was then acidified to pH 1.5 with 2N-hydrochloric acid and extracted with ethyl acetate (3 × 100 ml.). The ethyl acetate extracts were dried over magnesium sulphate, and evaporated. The gum was dissolved in ethyl acetate (40 ml.), and ether (60 ml.) added. The precipitate was filtered off and the filtrate evaporated to give an orange gum (5.9 g.).

A solution of the above orange gum (5.9 g.) in tetrahydrofuran (65 ml.) was treated with an excess of diphenyldiazomethane (prepared from 4.5 g. of benzophenone hydrazone) in ether (80 ml.). After 1 hour the solution was treated with glacial acetic acid (2 ml.), and evaporated. The resulting gum was chromatographed on a silicic acid column (4 × 15 cms.) with (a) benzene and (b) benzene:ethyl acetate = 9:1. Those fractions containing a substance R$_f$ ca. 0.7 on thin-layer chromatography (silica gel GF 254, with benzene:ethyl acetate = 5:1) were combined and evaporated to give a pale yellow gum (1.73 g.), which was diphenylmethyl 3-isopropoxymethyl-7eys-(2'-thienylacetamido)-ceph-3-em-4-carboxylate. The 7-side chain was removed by the general method described in Example 3(a), yielding the title compound (600 mg., 3.3 percent based on the dichloroacetoxymethyl compound), $\lambda_{max.}$ (ethanol) 263 nm ($\epsilon$6,600), $\nu_{max.}$ 1,792 ($\beta$-lactam), 1,728 (COOR) and 1,130 (SO$_3^-$)cm$^{-1}$ (Found: C, 61.1; H, 6.0; N, 4.3; S, 10.3. C$_{31}$H$_{34}$N$_2$O$_7$S$_2$ requires C, 61.0; H, 5.6; N, 4.6; S, 10.5 percent), N.M.R. (CDCl$_3$) 5.41 and 5.83 (quartet, J = 16 Hz, —CH$_2$OCH(CH$_3$)$_2$), 6.62, 8.99$\tau$(—CH$_2$—CH (CH$_3$)$_2$ respectively.

Another experiment afforded diphenylmethyl 7$\beta$-amino-3-isopropoxymethylceph-3-em-4-carboxylate in a crystalline condition, m.p. 157°–161° (d), $[\alpha]_D^{28}$ — 3° (C 1.0; ethanol), before the formation of the p-toluenesulphonic acid salt.

b. 7$\beta$-(D-$\alpha$-Amino-$\alpha$-phenylacetamido)-3-isopropoxymethylceph-3-em-4-carboxylic acid Acylation of diphenylmethyl 7$\beta$-amino-3-isopropoxymethylceph-3-em-4-carboxylic acid hydrogen-p-toluene sulphonate (0.94 g., 1.47 mmole.) with the mixed anhydride from N-(t-butoxycarbonyl)-D-phenylglycine (0.77 g., 3.06 mmole.) and isobutylchloroformate, by the general method described in Example 3(b), gave the title compound (0.46 g., 74 percent), $[\alpha]_D^{28}$ + 45° (C 1, H$_2$O), $\nu_{max.}$ (water) 260 nm ($\epsilon$6,900), $\nu_{max.}$ (Nujol) 1,766 ($\beta$-lactam) and 1,695 (COO$^-$) cm.$^{-1}$., N.M.R. (D$_2$O) 5.26, 6.02, 8.67$\tau$(—CH$_2$OCH (CH$_3$)$_2$ respectively)R$_f$ 0.76 (system A), 0.18 (system B.) This material was contaminated by impurities not revealed on the chromatograms under ultra-violet light; the main impurity is probably α-phenylglycine (ca. 30 percent) (Found: S:N = 1:4.1. Calc. for $C_{19}H_{23}N_3O_5S$: S:N = 1:3).

7β-But-3-enamido-3-methoxymethylceph-3-em-4-carboxylic acid

A solution of diphenylmethyl 7β-amino-3-methoxymethyl-ceph-3-em-4-carboxylate hydrogen p-toluenesulphonate (1.5 g., 2.58 mmole.) in N,N-dimethylacetamide (3 ml.) and acetonitrile (10 ml.) was treated with vinylacetylchloride (1 g., 9.6 mmole). The solution was kept at room temperature for 15 minutes, when it was evaporated under reduced pressure. The resulting oil was dissolved in ethyl acetate and the solution extracted with aqueous sodium hydrogen carbonate. After evaporation of the solution the crystalline solid was treated with trifluoracetic acid (10 ml.) and anisole (3 ml.). After 8 minutes the reagents were removed under reduced pressure. The residue was dissolved in ethyl acetate (3 ml.) from which the title compound separated as colorless prisms (300 mg., 37 percent), m.p. 157°–161° (decomp.), $[\alpha]_D^{25}$ + 95° (C 1, tetrahydrofuran), $\lambda_{max.}$ (ethanol) 261 nm (ε 6,600), $\nu_{max.}$ (Nujol) 1,773 (β-lactam), 1,662 and 1,540 (—CONH—) and 1,700 (COOH) cm.$^{-1}$, N.M.R. ($D_2O$/NaHCO$_3$)4.75 ($CH_2=CHCH_2$—), 3.8–4.27 ($CH_2 = CHCH_2$—), 6.87 ($CH_2 = CHCH_2$—), 5.80 (—$CH_2OCH_3$) and 6.71 τ (—$CH_2OCH_3$).

EXAMPLE 31

7β-Phenylacetamido-3-2'-tetrahydropyranyloxymethylceph-3-em-4-carboxylic acid.

A solution of 3-hydroxymethyl-7β-phenylacetamidoceph-3-em-4-carboxylic acid (500 mg., 1.4 mmole.), 2,3-dihydropyran (370 mg., 4.2 mmole.) and toluene-p-sulphonic acid (10 mg.) in tetrahydrofuran (15 ml.) was kept at room temperature for 2 hours. The solvent was then removed and the residue partitioned between ethyl acetate and dilute sodium bicarbonate solution; the aqueous layer was acidified and the product extracted into ethyl acetate. This solution was dried and evaporated to give the title compound as a white solid (250 mg.) which was washed with ether and dried, $\lambda_{max.}$ (pH 6 phosphate buffer) 258–260 nm (ε8,700), $\nu_{max.}$ (Nujol) 3,250 (NH), 1,780 (β-lactam), 2,600 and 1,720 (—COOH), and 1,570 and 1,660 cm.$^{-1}$ (CONH), N.M.R. ($D_2O$ with NaHCO$_3$), 6.31 (2-proton singlet; PhCH$_2$CO), 4.38 (1-proton doublet; C$_7$—H), 4.92 (1-proton doublet; C$_6$—H) 5.62 (1-proton triplet;

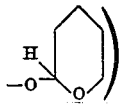

and 8.35 τ(6-proton multiplet; tetrahydropyranyl methylenes at C′$_3$, C′$_4$, and C′$_5$). (Found: C, 58.6; H, 5.8; N, 6.4; S, 7.3. $C_{21}H_{24}N_2O_6S$ requires C, 58.3; H, 5.6; N, 6.5; S, 7.4 percent), $R_f$ 0.67 (system C).

EXAMPLE 32

Diphenylmethyl 3-[(1′-ethoxy)ethoxy]methyl-7β-(2′-thienylacetamido)ceph-3-em-4-carboxylate.

Diphenylmethyl 3-hydroxymethyl-7β-(2′-thienylacetamido)-ceph-3-em-4-carboxylate (5.42 g., 10 mmole.) and ethyl vinyl ether (1.44 g., 20 mmole.) were dissolved in dry tetrahydrofuran (100 ml.), and toluene p-sulphonic acid (100 mg.) added. After standing at room temperature for 45 minutes the solution was evaporated and the residue partitioned between ethyl acetate and dilute sodium hydrogen carbonate. The organic layer was dried, concentrated, and added to a large volume of petrol (b.p. 40°–60°), with vigorous stirring to give a solid (4.1 g.). This solid was chromatographed on Kiesel 0.05–0.2 (E.Merck AG, Darmstadt, W. Germany) and the fractions eluted with benzene:ethyl acetate = 5:1 were combined. Evaporation of the combined eluates gave a gum which solidified on trituration with cold ethanol (850 mg.); the ethanol on evaporation gave a gum (1.2 g.) which was identical on TLC with the solid, m.p. 122°, $[\alpha]_D$ + 11° (c. 1.0; tetrahydrofuran), $\lambda\lambda_{max.}$ (ethanol) 235 nm (ε14,000) and 260 nm (ε7,500), $\nu_{max.}$ (bromoform) 3,380 (NH), 1,774 (β-lactam), 1,712 ($CO_2CHPh_2$), 1,672 and 1,505 cm.$^{-1}$ (—CONH), N.M.R. (CDCl$_3$) 8.90 (3-proton triplet, J 7 Hz; —CH$_2$CH$_3$), 8.87 (3-proton doublet, J 5.5 Hz; CH—CH$_3$), 6.53 (4-proton multiplet; C$_2$-methylene and —OCH$_2$CH$_3$) and 5.62 τ (2-proton singlet; C$_3$—CH$_2$) (Found: C, 63.3; H, 5.4; N, 4.5; S, 10.8. $C_{31}H_{32}N_2O_6S_2$ (592.6) requires C, 62.8; H, 5.5; N, 4.7; S, 10.8 percent). $R_f$ 0.375 (Kieselgel H plates, ethyl acetate:benzene = 1.5).

EXAMPLE 33

Sodium 3-[(1′-ethoxy)ethoxy]methyl-7β-(2″-thienylacetamido)ceph-3-em-4-carboxylate 3-Hydroxymethyl-7β-(2′-thienylacetamido)ceph-3-em-4-carboxylic acid (354 mg., 1 mmole) was suspended in dry acetone (15 ml.) containing ethyl vinyl ether (216 mg., 3 mmole) and toluene-p-sulphonic acid (5 mg.). The mixture was stirred at room temperature for 30 minutes, during which time the acid dissolved. 10 percent-Sodium 2-ethylhexanoate in acetone (1.7 ml., 1 mmole) was then added and the mixture cooled at 0° for 1 hour. The title compound (180 mg.) was filtered off, washed with ether, and dried, $[\alpha]_D^{23}$ + 115° (c 1.0; water), $\lambda\lambda_{max.}$ (pH 6 phosphate buffer) 237 nm (ε13,500) and 260 nm (ε8,500), $\nu_{max.}$ (Nujol) 1,760 (β-lactam), 1,670 and 1,540 (—CONH), and 1,590 cm.$^{-1}$ (COO$^-$). N.M.R. ($D_2O$) 8.64 (CH$_3$—CH), 8.78 (CH$_3$ CH$_2$), and 5.64 (CH$_2$—O—C). (Found: C, 45.9; H, 4.6; N, 5.8; S, 13.2. $C_{18}H_{21}N_2NaO_6S_2$·$H_2O$(448) requires C, 46.3; H, 4.9; N, 6.0; S, 13.7 percent. $R_f$ 0.60 (system C).

| | Tube dilution assay (γ/ml.) | | | | | | | | | Mouse protection ($ED_{50}$/mg./kg./dose) | | |
|---|---|---|---|---|---|---|---|---|---|---|---|---|
| | Gram positive | | | | | Gram negative | | | | | | |
| Compound of example No. | Staph. aureus 604 | Staph. aureus 663 | Staph. aureus 3452 | Staph. aureus 11092 | Staph. aureus 11127 | Strep. faecalis 850 | E. coli 573 | S. typhimurium 804 | Pr. mirabilis 431 | Ps. pyocyanea 150 | S. aureus 663 (S.C.)[3] | S. aureus 11127 (S.C.)[3] | ROUR[4] |
| 2(c) | 0.31 | 0.04 | 4 | >2.5 |  | 62 | 125 | 250 | 125 | 125 | ~25 | ~25 | 1.6 |
| 3(b): | | | | | | | | | | | | | |
| (1) | 0.31 | 0.31 | 4.0 | 125 |  | 62 | 8 | 8 | 16 | 250 | ~50 | ~50 | 15.5 |
| (2) | 1.25 | 0.62 | 8.0 | 250 |  | 125 | 16 | 16 | 62 | 250 |  |  |  |
| 4 | 0.31 | 0.04 | 4 | >2.5 |  | 62 | 250 | 250 | 250 | 125 |  | <6 | 4 |
| 5 | 0.62 | 0.04 | 31 | >2.5 |  | 125 | 31 | 250 | 250 | 250 |  | ~50 | 4 |
| 6 | 2.5 | 0.6 | 31 | >2.5 |  | 250 | 250 | 250 | 250 | 125 |  | >50 | 32 |
| 10(c) | 0.62 | 0.08 | <0.5 |  |  |  | 250 | >250 | >250 | >250 | <6 |  | 4.25 |
| 11 | 1.25 | 0.16 | 16.0 |  |  |  | 125 | 125 | 125 | 62 | <6 |  | 5.45 |
| 13 | 0.16 | 0.02 | 8 |  | 2 | 16 | >250 | >250 | >250 | >250 |  | >50 | 0.4 |
| 16 | 1.25 | 0.3 | 8 |  | 2 | 125 | 62 | 125 | 250 | 125 |  | <6 | 9.5 |
| 17 | 0.62 | 0.31 | 16 |  | 2 | >250 | 250 | 125 | 250 | 125 |  | 6 | 3 |
| 18 | >2.5 | 0.62 | 4 |  | 31 | 62 | 31 | 16 | 16 | >250 |  | 25 | 3 |
| 20 | 0.62 | 0.16 | 0.5 |  | <0.5 | 16 | 250 | >250 | >250 | >250 |  |  | 4.9 |
| 21 | 2.5 | 1.25 | 4 |  | 8 | >250 | 250 | 250 | 250 | >250 |  |  | 11 |
| 22 | 2.5 | 2.5 | 4 |  | 4 | >250 | 250 | 250 | >250 | >250 |  | >50 | 7 |
| 23 | 0.3 | 0.04 | <0.5 |  | 0.5 | 31 | >250 | 250 | >250 | >250 |  | 12 | 5.9 |
| 24 | 0.6 | 0.3 | <0.5 |  | 1 | 31 | 125 | 62 | 31 | >250 |  |  |  |
| 25 | 0.08 | 0.03 | <0.5 |  | 0.5 | 125 | >250 | >250 | >250 | >250 |  | 50 | 1.7 |
| 26 | 0.31 | 0.04 | <0.5 |  | 0.5 | 16 | >250 | >250 | >250 | >250 |  | >50 | <1 |
| 27 | 1.25 | 0.08 | <0.5 |  | 2 | 31 | 250 | >250 | 62 | >250 |  | >50 | <1 |
| 28 | 0.31 | 0.16 | 2 |  | 2 | 125 | 125 | 62 | 62 | 250 |  | 30 | 1 |
| 29 | 2.5 | 1.25 | 8 |  | 8 | >250 | >250 | >250 | >250 | >250 |  | >50 | 3.1 |

[1] 10 hours. [2] 21 hours. [3] Subcutaneous. [4] ROUR=Percent recovery of the antibiotic from the urine of female rats following oral administration of the antibiotic.

PHARMACEUTICAL EXAMPLES

A. Tablet

| | |
|---|---|
| a. 7β-(D-α-Amino-α-phenylacetamido)-3-methoxymethylceph-3-em-4carboxylic acid | 250 mg. |
| b. Mannitol | 75 mg. |
| c. Potato starch | 46 mg. |
| d. Maize starch | 25 mg. |
| e. Magnesium stearate | 4 mg. |

The dry ingredients (a), (b) and (c) were blended together and granulated with a 10 percent aqueous paste of (d). The granules were passed through a No. 12 mesh (B.S.) screen, dried to constant weight and sieved through a No. 16 mesh (B.S.) screen. The granules were then lubricated by blending in (e) and compressed at 400 mg. per tablet on suitable punches. The tablets may be coated if required, for instance with a readily soluble conventional film coating.

B. Capsule

| | |
|---|---|
| 7β-(D-α-Amino-α-phenylacetamido)-3-methoxymethylceph-3-em-4-carboxylic acid | 250 mg. |
| *Aerosil compositum | 3 mg. |

(*A silicon dioxide/starch blend available from Bush, Beach and Gent of Marlon House, Lloyd's Avenue, London, E.C.3.)

The dry powders were blended together homogeneously and distributed into well filled, hard-gelatin capsules, so that each contained 250 mg. of the active ingredient.

C. Veterinary Product — Intramammary preparation

| | |
|---|---|
| 7β(D-α-Amino α-phenylacetamido)-3-methoxymethylceph-3-em-4-carboxylic acid (sterile) | 100 mg. |
| Aluminum stearate (3 percent w/w) gel in liquid paraffin to make up to | 3 g. |

The gel base was prepared in a conventional manner by distributing the aluminum stearate in the oil and heating, with stirring, until gelling took place. The base was further heated under sealed conditions to effect sterilization and thereafter subjected to rapid cooling without stirring, to produce a thick gel. The active ingredient was incorporated into the required amount of base under aseptic conditions, suitable stirring and refining processes being used to ensure a homogeneous mix. The product was distributed into sterilized tubes with suitable applicator nozzles for intramammary use, so that a quantity of 3 g. could be extruded from each tube.

We claim:

1. A compound of the formula

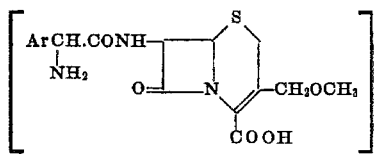

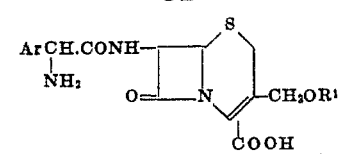

wherein Ar is thienyl, phenyl, or phenyl substituted by halo, hydroxy, lower alkyl, nitro, amino, lower alkanoyl, lower alkoxy or lower alkylmercapto and $R^1$ is lower alkyl; or a non-toxic salt thereof.

2. A compound as defined in claim 1 in which $R^1$ is methyl.

3. A compound as defined in claim 1 in which Ar is phenyl.

4. A compound as defined in claim 1 in which the group at position -7 is of the D-series.

5. A compound as defined in claim 1 of the formula

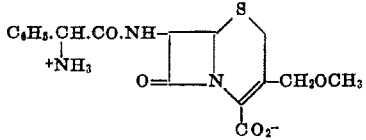

6. A compound as defined in claim 1 which is 7β-(D-α-amino-α-phenylacetamido)-3-methoxymethylceph-3-em-4-carboxylic acid.

7. A compound as defined in claim 1 which is 7β-(D-α-amino-α-phenylacetamido)-3-ethoxymethylceph-3-em-4-carboxylic acid.

8. A compound as defined in claim 1 which is 7β-(D-α-amino-α-phenylacetamido)-3-isopropoxymethylceph-3-em-4-carboxylic acid.

9. A compound of the formula

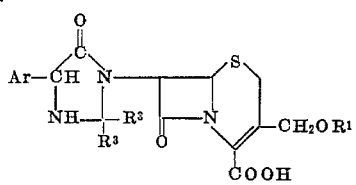

wherein Ar is thienyl phenyl or phenyl substituted by halo, hydroxy, lower alkyl, nitro, amino, lower alkanoyl, lower alkoxy or lower alkylmercapto and $R^1$ and $R^3$ are lower alkyl; or a non-toxic salt thereof.

10. A compound as defined in claim 9 in which $R^1$ is methyl.

11. A compound as defined in claim 10 in which $R^3$ is methyl.

12. A compound as defined in claim 9 which is 7β-(2',2'-dimethyl-5'-oxo-4'-phenyl-1'-imidazolidinyl)-3-methoxymethylceph-3-em-4-carboxylic acid.

* * * * *